United States Patent
He et al.

(10) Patent No.: US 11,287,615 B2
(45) Date of Patent: Mar. 29, 2022

(54) CAMERA LENS SET

(71) Applicant: ZHEJIANG SUNNY OPTICAL CO., LTD., Ningbo (CN)

(72) Inventors: Lingbo He, Ningbo (CN); Fujian Dai, Ningbo (CN); Jianke Wenren, Ningbo (CN)

(73) Assignee: ZHEJIANG SUNNY OPTICAL CO., LTD., Zhejiang (CN)

( * ) Notice: Subject to any disclaimer, the term of this patent is extended or adjusted under 35 U.S.C. 154(b) by 209 days.

(21) Appl. No.: 16/832,455

(22) Filed: Mar. 27, 2020

(65) Prior Publication Data

US 2020/0225450 A1 Jul. 16, 2020

Related U.S. Application Data

(63) Continuation of application No. PCT/CN2019/077462, filed on Mar. 8, 2019.

(30) Foreign Application Priority Data

May 9, 2018 (CN) .......................... 201810437381.8

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G02B 13/02* (2013.01); *G02B 27/0025* (2013.01); *H04N 5/2254* (2013.01)

(58) Field of Classification Search
CPC .................. G02B 13/0045; G02B 9/60; G02B 15/145113
(Continued)

(56) References Cited

U.S. PATENT DOCUMENTS 8,717,687 B2 5/2014 Hsu et al.
9,658,434 B2 5/2017 Lee et al.
(Continued)

FOREIGN PATENT DOCUMENTS

CN 105676415 A 6/2016
CN 107462976 A 12/2017
(Continued)

OTHER PUBLICATIONS

International Search Report dated Apr. 20, 2019, in connection with Chinese Patent Application No. PCT/CN2019/077462.
(Continued)

*Primary Examiner* — Noam Reisner
(74) *Attorney, Agent, or Firm* — Norris McLaughlin, P.A.

(57) ABSTRACT

A camera lens group including a first to a fifth lens arranged sequentially from the object side to image side is provided. The first lens has a positive refractive power, and object-side surface thereof is a convex surface; the second lens has a negative refractive power, and image-side surface thereof is a concave surface; the third and the fourth lens each has a refractive power, and an object-side surface of the third lens is a convex surface; the fifth lens has a negative refractive power, and an image-side surface thereof is a concave surface; an effective focal length f of the camera lens group and half of a diagonal length ImgH of an effective pixel area on an image plane of the camera lens group satisfy: $3.5 < f/\text{ImgH} < 4.5$; and an effective focal length f1 of the first lens and an entrance pupil diameter EPD of the camera lens group satisfy: $3 < f1/\text{EPD} < 4.5$.

20 Claims, 12 Drawing Sheets

(51) Int. Cl.
G02B 13/02 (2006.01)
G02B 27/00 (2006.01)
H04N 5/225 (2006.01)

(58) Field of Classification Search
USPC .................................................. 359/763, 764
See application file for complete search history.

(56) References Cited

U.S. PATENT DOCUMENTS

2016/0161714 A1    6/2016  Lee et al.
2016/0306140 A1*  10/2016  Chen ........................ G02B 9/62
2018/0017767 A1*   1/2018  Chen .................. G02B 13/0065

FOREIGN PATENT DOCUMENTS

| CN | 107608057 A | 1/2018 |
| CN | 206876946 U | 1/2018 |
| CN | 108333725 A | 7/2018 |

OTHER PUBLICATIONS

English Translation of International Search Report dated Apr. 20, 2019, in connection with Chinese Patent Application No. PCT/CN2019/077462.
Written Opinion dated Jun. 14, 2019, in connection with Chinese Patent Application No. PCT/CN2019/077462.
Translation of Office Action dated Apr. 13, 2021, in connection with Indian Patent Application No. 202047015960.

* cited by examiner

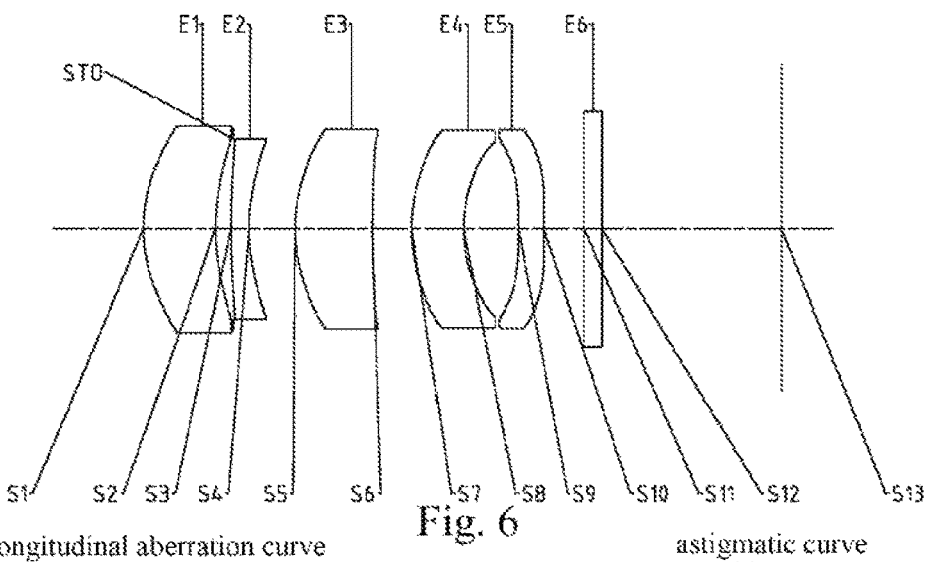
Fig. 6
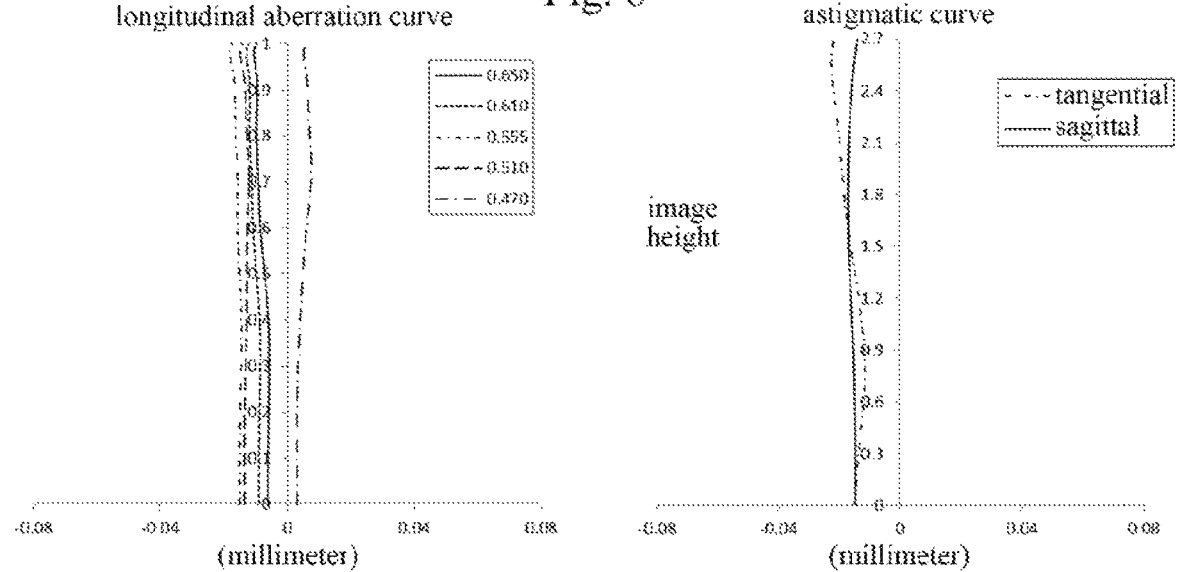
Fig. 7
Fig. 8
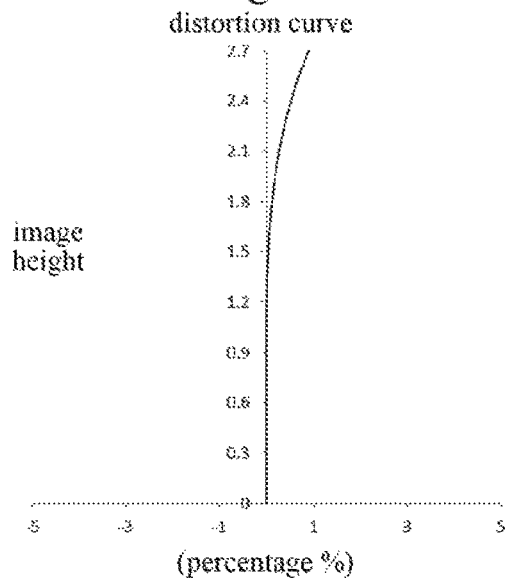
Fig. 9
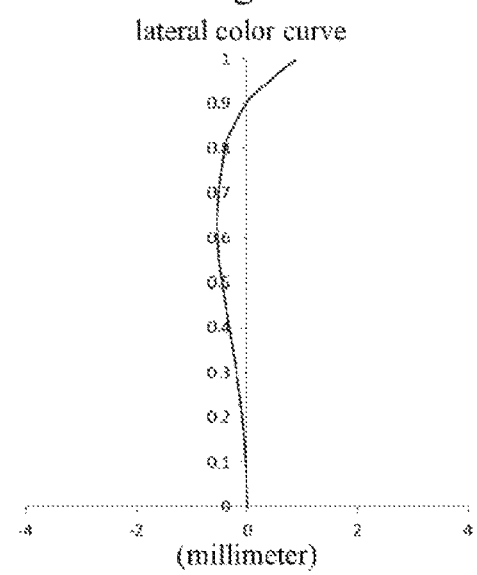
Fig. 10

CAMERA LENS SET

CROSS-REFERENCE TO RELATED APPLICATIONS

The present patent application is a continuation of International Application No. PCT/CN2019/077462, filed on Mar. 8, 2019, which claims the priority from Chinese Patent Application No. 201810437381.8, filed in the National Intellectual Property Administration (CNIPA) on May 9, 2018, the disclosure of which are hereby incorporated by reference in their entirety.

TECHNICAL FIELD

The present disclosure relates to a camera lens group, and more specifically to a camera lens group including five lenses.

BACKGROUND

In recent years, with the development of science and technology, the thickness of the overall mobile phone is constantly reducing, limiting the total length of a lens assembly and increasing the difficulty of designing the lens assembly of the mobile phone. On the other hand, consumer demands for mobile phones having ideal camera effects are also increasing. This requires high imaging quality and miniaturization of camera lens assemblies.

In order to meet miniaturization, the number of lenses of a camera lens group needs to be reduced as many as possible, but the lack of design freedom caused thereby may make it difficult to meet the market demand for high imaging performance. At present, the image-side surface of the fourth lens in a common five-lens camera lens group is often in a convex shape, and the thicknesses of the lenses vary significantly, which is not conducive to lens formation and may easily cause the camera lens group to be overly sensitive. In addition, in order to obtain an image of wide viewing field, the current mainstream camera lens group mainly uses a wide-angle camera lens group. However, this is not conducive to capturing a distant object and cannot obtain a clear image.

Therefore, the present disclosure intends to provide a camera lens group having a telephoto function, high resolution, and miniaturization.

SUMMARY

To solve at least one of the problems in the existing technology, the present disclosure provides a camera lens group.

An aspect of the present disclosure provides a camera lens group. The camera lens group sequentially includes, from an object side to an image side: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface; an effective focal length f of the camera lens group and half of a diagonal length ImgH of an effective pixel area on an image plane of the camera lens group satisfying: $3.5 < f/\text{ImgH} < 4.5$; and an effective focal length f1 of the first lens and an entrance pupil diameter EPD of the camera lens group satisfying: $3 < f1/\text{EPD} < 4.5$.

According to an embodiment of the present disclosure, a center thickness CT5 of the fifth lens on an optical axis and a maximum effective radius DT52 of the image-side surface of the fifth lens satisfy: $CT5/DT52 < 0.3$.

According to an embodiment of the present disclosure, the effective focal length f of the camera lens group, the effective focal length f1 of the first lens, an effective focal length f2 of the second lens and an effective focal length f5 of the fifth lens satisfy: $1 < |f/f1| + |f/f2| + |f/f5| < 4$.

According to an embodiment of the present disclosure, the effective focal length f of the camera lens group, half of a maximal field-of-view HFOV of the camera lens group and a center thickness CT3 of the third lens on the optical axis satisfy: $2 \le f^*\tan(\text{HFOV})/CT3 < 2.5$.

According to an embodiment of the present disclosure, a radius of curvature R4 of the image-side surface of the second lens, a radius of curvature R5 of the object-side surface of the third lens, a radius of curvature R9 of an object-side surface of the fifth lens and a radius of curvature R10 of the image-side surface of the fifth lens satisfy: $-0.1 < (R4+R5)/(R9+R10) < 0.4$.

According to an embodiment of the present disclosure, a combined focal length f23 of the second lens and the third lens and a combined focal length f45 of the fourth lens and the fifth lens satisfy: $-0.3 < (f23+f45)/(f23-f45) < 0.5$.

According to an embodiment of the present disclosure, a sum of central thicknesses ECT of the first lens to the fifth lens on the optical axis and a distance on the optical axis TTL from the object-side surface of the first lens to the image plane satisfy: $0.2 < \Sigma CT/TTL < 0.5$.

According to an embodiment of the present disclosure, an air spacing T12 between the first lens and the second lens on the optical axis and an air spacing T45 between the fourth lens and the fifth lens on the optical axis satisfy: $T12/T45 < 0.5$.

According to an embodiment of the present disclosure, a radius of curvature R1 of the object-side surface of the first lens and a radius of curvature R2 of an image-side surface of the first lens satisfy: $-0.5 < (R1-R2)/(R1+R2) < 0$.

According to an embodiment of the present disclosure, $0.2 < (SAG31+SAG41)/(T23+T34) < 1.5$, where, SAG31 is a distance on the optical axis from an intersection of the object-side surface of the third lens and the optical axis to a vertex of an effective radius of the object-side surface of the third lens, SAG41 is a distance on the optical axis from an intersection of an object-side surface of the fourth lens and the optical axis to a vertex of an effective radius of the object-side surface of the fourth lens, T23 is an air spacing between the second lens and the third lens on the optical axis and T34 is an air spacing between the third lens and the fourth lens on the optical axis.

An aspect of the present disclosure provides a camera lens group. The camera lens group sequentially includes, from an object side to an image side: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface; and a radius of curvature R1 of the object-side surface of the first lens and a radius of curvature R2 of an image-side surface of the first lens satisfying: $-0.5<(R1-R2)/(R1+R2)<0$.

An aspect of the present disclosure provides a camera lens group. The camera lens group sequentially includes, from an object side to an image side: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface; and $0.2<(SAG31+SAG41)/(T23+T34)<1.5$, where, SAG31 being a distance on an optical axis from an intersection of the object-side surface of the third lens and the optical axis to a vertex of an effective radius of the object-side surface of the third lens, SAG41 being a distance on the optical axis from an intersection of an object-side surface of the fourth lens and the optical axis to a vertex of an effective radius of the object-side surface of the fourth lens, T23 being an air spacing between the second lens and the third lens on the optical axis and T34 being an air spacing between the third lens and the fourth lens on the optical axis.

An aspect of the present disclosure provides a camera lens group. The camera lens group sequentially includes, from an object side to an image side: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface; and a center thickness CT5 on an optical axis of the fifth lens and a maximum effective radius DT52 of the image-side surface of the fifth lens satisfying: $CT5/DT52<0.3$.

An aspect of the present disclosure provides a camera lens group. The camera lens group sequentially includes, from an object side to an image side: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface; and a radius of curvature R4 of the image-side surface of the second lens, a radius of curvature R5 of the object-side surface of the third lens, a radius of curvature R9 of an object-side surface of the fifth lens and a radius of curvature R10 of the image-side surface of the fifth lens satisfying: $-0.1<(R4+R5)/(R9+R10)<0.4$.

The camera lens group according to the present disclosure has a telephoto function, high resolution, and miniaturization.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIG. 6 is a schematic structural diagram illustrating a camera lens group according to Embodiment 2;

FIGS. 7-10 respectively illustrate a longitudinal aberration curve, an astigmatic curve, a distortion curve and a lateral color curve of the camera lens group according to Embodiment 2;

DETAILED DESCRIPTION OF EMBODIMENTS

Figure 1:
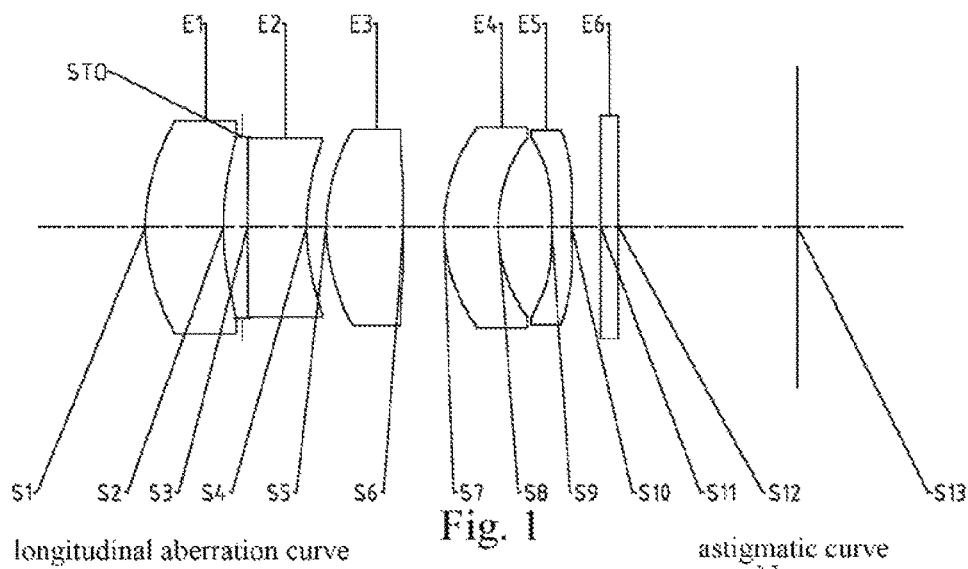
FIG. 1 is a schematic structural diagram illustrating a camera lens group according to Embodiment 1.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements.

It should be understood that in the present disclosure, when an element or layer is described as being "on," "connected to," or "coupled to" another element or layer, the element or layer may be directly on another element or layer, or directly connected to or coupled to another element or layer, or there may be an intervening element or layer. When an element is referred to as being "directly on," "directly connected to," or "directly coupled to" another element or layer, there are no intervening elements or layers. Throughout the specification, identical reference numerals refer to the same elements. The expression "and/or" used in this text includes any and all combinations of one or more of the associated listed items.

It should be understood that although the terms $1^{st}$, $2^{nd}$, or first, second, etc. may be used herein to describe various elements, components, areas, layers, and/or sections, these elements, components, areas, layers, and/or sections should not be limited by these terms. These terms are only used to distinguish one element, component, area, layer, or section from another element, component, area, layer, or section. Thus, the first element, component, area, layer, or section discussed below may be termed as the second element, component, area, layer, or section without departing from the teachings of the present disclosure.

The terminology used herein is for the purpose of describing specific embodiments only and is not intended to limit the present disclosure. As used herein, unless explicitly stated otherwise in the context, a term, even the form of the term is not defined as a singular or plural, includes singular and plural meanings. It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of . . . ," when preceding a list of elements, modify the entire list of elements rather than the individual element in the list. Further, the use of "may," when describing the embodiments of the present disclosure, relates to "one or more embodiments of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides a camera lens group, from an object side to an image side sequentially includes: a first lens having a positive refractive power, and an object-side surface of the first lens being a convex surface; the second lens having a negative refractive power, and an image-side surface of the second lens being a concave surface; the third lens having a refractive power, and an object-side surface of the third lens being a convex surface; the fourth lens having a refractive power; the fifth lens having a negative refractive power, and an image-side surface of the fifth lens being a concave surface.

In an embodiment of the present disclosure, an effective focal length f of the camera lens group and half of a diagonal length ImgH of an effective pixel area on an image plane of the camera lens group satisfy: 3.5<f/ImgH<4.5; and an effective focal length f1 of the first lens and an entrance pupil diameter EPD of the camera lens group satisfy: 3<f1/EPD<4.5. Specifically, satisfy: 3.56 f/ImgH4.08; 3.1 f1/EPD4.32. At the same image height of the camera lens group, it may produce a large negative distortion if the focal length is too long, and it may lead to poor processability and cause difficulty in ensuring the brightness of an edge image surface if it is too short. By satisfying the above conditional expressions, it is conducive to giving consideration to both distortion and processability while achieving a telephoto effect, which effectively improves aberrations of the camera lens group, and ensures an excellent resolution performance.

In an embodiment of the present disclosure, a center thickness CT5 of the fifth lens on an optical axis and a maximum effective radius DT52 of the image-side surface of the fifth lens satisfy: CT5/DT52<0.3, specifically, satisfy: CT5/DT52≤0.27. By satisfying the above relationship, the center thickness of the fifth lens on the optical axis and the maximum effective radius of the image-side surface of the fifth lens can be controlled reasonably, which is beneficial to ensuring the lens molding processability and assembly stability.

In an embodiment of the present disclosure, the effective focal length f of the camera lens group, the effective focal length f1 of the first lens, an effective focal length f2 of the second lens and an effective focal length f5 of the fifth lens satisfy: 1<|f/f1|+|f/f2|+|f/f5|<4, specifically, satisfy: 1.31≤|f/f1|+|f/f2|+|f/f5|≤3.65. By satisfying the above relationship, it is possible to reasonably allocate the refractive powers, which is beneficial to the realization of a lens assembly telephoto function, and at the same time effectively reduces the lens assembly distortion and improves the imaging quality of the lens assembly.

In an embodiment of the present disclosure, the effective focal length f of the camera lens group, half of a maximal field-of-view HFOV of the camera lens group and a center thickness CT3 of the third lens on the optical axis satisfy: 2≤f*tan(HFOV)/CT3≤2.5, specifically, satisfy: 2.04≤f*tan(HFOV)/CT3≤2.24. By satisfying the above relationship, the center thickness of the third lens can be reasonably allocated, which is beneficial to reducing the angle of the chief ray, at the same time ensuring the stability of the assembly processability.

In an embodiment of the present disclosure, a radius of curvature R4 of the image-side surface of the second lens, a radius of curvature R5 of the object-side surface of the third lens, a radius of curvature R9 of an object-side surface of the fifth lens and a radius of curvature R10 of the image-side surface of the fifth lens satisfy: $-0.1<(R4+R5)/(R9+R10)<0.4$, more specifically, satisfy: $-0.09\leq(R4+R5)/(R9+R10)\leq0.27$. If the ratio is too small, the fifth lens bears too much refractive power, and the processability is too poor and not conducive to correcting aberrations; and if the ratio is too large, the aperture of the third lens is too large, resulting in poor assembly processability. By making the ratio satisfy the above conditional expression, it is possible to realize a miniaturization solution while ensuring the aberrations.

In an embodiment of the present disclosure, a combined focal length f23 of the second lens and the third lens and a combined focal length f45 of the fourth lens and the fifth lens satisfy: $-0.3<(f23+f45)/(f23-f45)<0.5$, more specifically, satisfy: $-0.19\leq(f23+f45)/(f23-f45)\leq0.43$. By satisfying the above relationship, the combined focal length of the second lens and the third lens and the combined focal length of the fourth lens and the fifth lens can be reasonably allocated, which is beneficial to correcting an overall aberration of the system.

In an embodiment of the present disclosure, a sum of central thicknesses $\Sigma CT$ of the first lens to the fifth lens on the optical axis and a distance on the optical axis TTL from the object-side surface of the first lens to the image plane satisfy: $0.2<\Sigma CT/TTL<0.5$, specifically, satisfy: $0.31\leq\Sigma CT/TTL\leq0.44$. If the ratio is too large, it may cause uneven size distribution of the single lenses, which is not conducive to miniaturization and cannot guarantee molding stability and timeliness; and if the ratio is too small, it is not easy to ensure the assembly processability, and not easy to correct an off-axis aberration, and at the same time increases the risk of ghosting. The present disclosure takes into account both the processability and the image quality. By satisfying the above formula, a better balance can be achieved between performance and processability.

In an embodiment of the present disclosure, an air spacing T12 between the first lens and the second lens on the optical axis and an air spacing T45 between the fourth lens and the fifth lens on the optical axis satisfy: $T12/T45<0.5$, specifically, satisfy: $T12/T45\leq0.48$. If the ratio between the air spacing on the optical axis between the first lens and the second lens and the air spacing on the optical axis between the fourth lens and the fifth lens is too large, it is not conducive to miniaturization of the system, and achieving this ratio effectively balances a lens assembly size and the processability.

In an embodiment of the present disclosure, a radius of curvature R1 of the object-side surface of the first lens and a radius of curvature R2 of an image-side surface of the first lens satisfy: $-0.5<(R1-R2)/(R1+R2)<0$, specifically, satisfy: $-0.37\leq(R1-R2)/(R1+R2)\leq0.11$. By satisfying the above relationship, the radius of curvature of the object-side surface of the first lens and the radius of curvature of the image-side surface of the first lens can be reasonably controlled, which is conducive to a reasonable allocation of the refractive powers and the correction of the overall aberration of the system.

In an embodiment of the present disclosure, $0.2<(SAG31+SAG41)/(T23+T34)<1.5$, where, SAG31 is a distance on the optical axis from an intersection of the object-side surface of the third lens and the optical axis to a vertex of an effective radius of the object-side surface of the third lens, SAG41 is a distance on the optical axis from an intersection of an object-side surface of the fourth lens and the optical axis to a vertex of an effective radius of the object-side surface of the fourth lens, T23 is an air spacing on the optical axis between the second lens and the third lens and T34 is an air spacing on the optical axis between the third lens and the fourth lens, specifically, satisfy: $0.21\leq(SAG31+SAG41)/(T23+T34)\leq1.27$. It is not conducive to miniaturization of the system if the ratio is too large, and it is not conducive to the assembly if it is too small. By making the ratio satisfy the above formula, it is possible to effectively balance the lens assembly size and the processability.

The present disclosure is further described in detail below in combination with the specific embodiments.

Embodiment 1

First, a camera lens group according to Embodiment 1 of the present disclosure is described with reference to FIGS. 1 to 5.

FIG. 1 is a schematic structural diagram illustrating the camera lens group according to Embodiment 1. As shown in FIG. 1, the camera lens group includes five lenses. The five lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, and a fifth lens E5 having an object-side surface S9 and an image-side surface S10. The first to fifth lenses E1 to E5 are sequentially arranged from an object side to an image side of the camera lens group.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a convex surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

The camera lens group further includes an optical filter E6 for filtering infrared light, the optical filter E6 has an object-side surface S11 and an image-side surface S12. In the present embodiment, light from an object sequentially passes through the surfaces S1 to S12 and finally forms an image on the image plane S13.

In the present embodiment, the first to fifth lenses E1 to E5 have respective effective focal lengths f1 to f5. The first lens E1 to the fifth lens E5 are sequentially arranged along the optical axis and collectively determines the total effective focal length f of the camera lens group. Table 1 below shows the effective focal lengths f1 to f5 of the first to fifth lenses E1 to E5, the total effective focal length f of the camera lens group, the total track length TTL (mm) of the camera lens group, and the half of the diagonal length ImgH (mm) of the effective pixel area on the image plane.

TABLE 1

| f1(mm) | 14.35 | f(mm) | 9.80 |
|---|---|---|---|
| f2(mm) | −5.84 | TTL(mm) | 10.94 |
| f3(mm) | 5.06 | ImgH (mm) | 2.70 |
| f4(mm) | 31.26 | | |
| f5(mm) | −13.91 | | |

Table 2 shows the surface type, the radius of curvature, the thickness, the refractive index, the abbe number and the conic coefficient of each lens of the camera lens group in the present embodiment. The units of the radius of curvature and the thickness are millimeters (mm).

TABLE 2

| surface number | surface type | radius of curvature | thickness | material refractive index | abbe number | conic coefficient |
|---|---|---|---|---|---|---|
| OBJ | spherical | infinite | infinite | | | |
| S1 | aspheric | 3.2900 | 1.3000 | 1.55 | 56.1 | −0.2987 |
| S2 | aspheric | 4.8806 | 0.3210 | | | 1.2848 |
| STO | spherical | infinite | 0.0858 | | | |
| S3 | aspheric | 73.0669 | 0.9909 | 1.65 | 23.5 | −62.0227 |
| S4 | aspheric | 3.5591 | 0.3316 | | | −12.2771 |
| S5 | aspheric | 2.7934 | 1.3000 | 1.55 | 56.1 | −5.0775 |
| S6 | aspheric | −210.7831 | 0.6794 | | | 99.0000 |
| S7 | aspheric | 2.5270 | 0.9028 | 1.65 | 23.5 | −7.2806 |
| S8 | aspheric | 2.4847 | 0.9008 | | | −4.7322 |
| S9 | aspheric | −200.0000 | 0.3372 | 1.55 | 56.1 | −99.0000 |
| S10 | aspheric | 7.9006 | 0.4892 | | | −13.2760 |
| S11 | spherical | infinite | 0.3000 | 1.52 | 64.2 | |
| S12 | spherical | infinite | 3.0005 | | | |
| S13 | spherical | infinite | | | | |

In the present embodiment, the aspheric lens may be used for each lens, and the surface type x of each aspheric surface is defined by the following formula:

$$x = \frac{ch^2}{1 + \sqrt{1 - (k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and Ai is the correction coefficient of the $i^{th}$ order of the aspheric surface.

Table 3 below shows the high-order coefficients applicable to the aspheric surfaces S1-S10 of the aspheric lenses in the present embodiment.

TABLE 3

| surface number | A4 | A6 | A8 | A10 | A12 | A14 | A16 |
|---|---|---|---|---|---|---|---|
| S1 | −1.2233E−03 | −4.8360E−04 | 1.4794E−04 | −1.2430E−05 | −4.9336E−06 | 1.7007E−06 | −1.2593E−07 |
| S2 | −2.8705E−03 | −6.4126E−03 | 3.0815E−03 | −9.0751E−06 | −3.8566E−04 | 1.3637E−04 | −1.6345E−05 |
| S3 | 2.6818E−03 | −1.2243E−02 | 9.0143E−03 | −2.7168E−03 | 2.4333E−04 | 6.0594E−05 | −1.3546E−05 |
| S4 | 2.5116E−02 | −2.8665E−02 | 2.2816E−02 | −9.9714E−03 | 2.6927E−03 | −4.4467E−04 | 3.1725E−05 |
| S5 | 9.6799E−03 | −1.0843E−02 | 7.4384E−03 | −1.9227E−03 | 3.2477E−04 | −3.5669E−05 | 1.9559E−06 |
| S6 | −2.5209E−02 | 1.2465E−02 | −7.7424E−03 | 4.5568E−03 | −1.5164E−03 | 2.9174E−04 | −2.0774E−05 |
| S7 | 2.7927E−02 | −6.3500E−03 | 3.6393E−03 | −1.6539E−03 | 5.5035E−04 | −1.2311E−04 | 1.2156E−05 |
| S8 | 9.9893E−03 | 1.8353E−02 | −9.9405E−03 | 3.9264E−03 | −5.2440E−04 | −1.8131E−04 | 3.4707E−05 |
| S9 | −1.4658E−01 | 5.6555E−02 | −7.2397E−03 | −6.9432E−03 | 5.8831E−03 | −1.9159E−03 | 2.1985E−04 |
| S10 | −1.2361E−01 | 6.2521E−02 | −2.2958E−02 | 5.3664E−03 | −1.8822E−04 | −2.6028E−04 | 4.7068E−05 |

Figure 2:
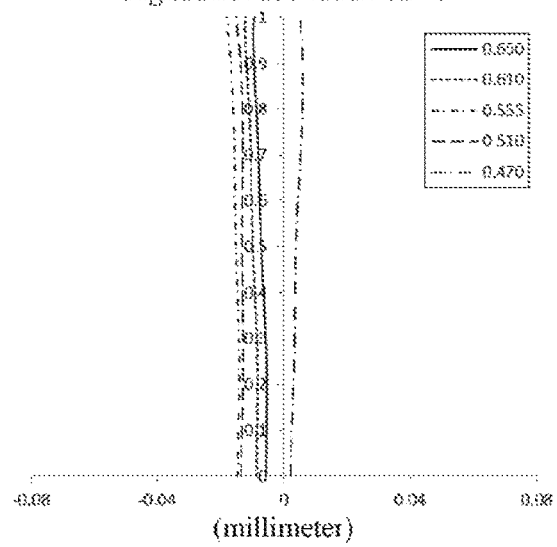
FIGS. 2-5 respectively illustrate a longitudinal aberration curve, an astigmatic curve, a distortion curve and a lateral color curve of the camera lens group according to Embodiment 1.
Figure 3:
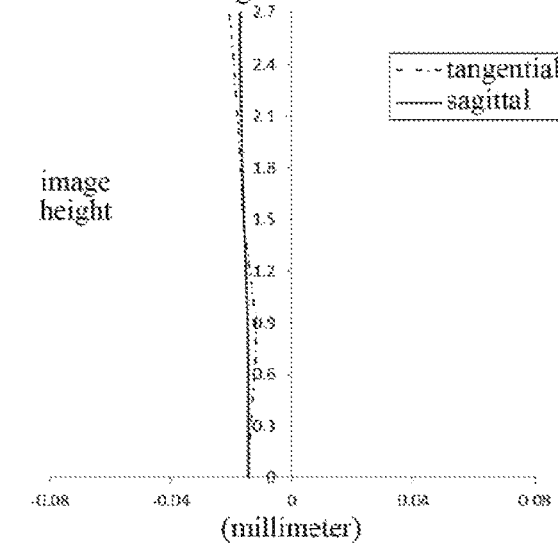
Figure 4:
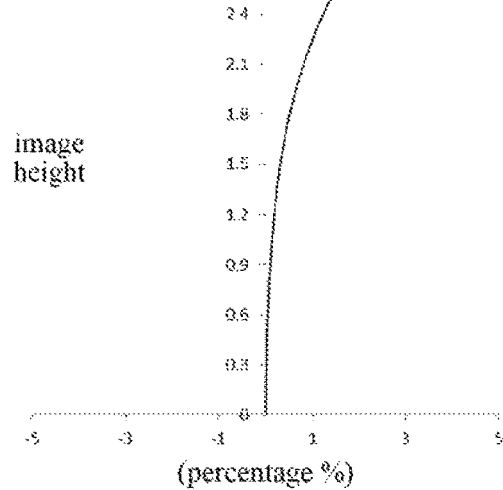
Figure 5:
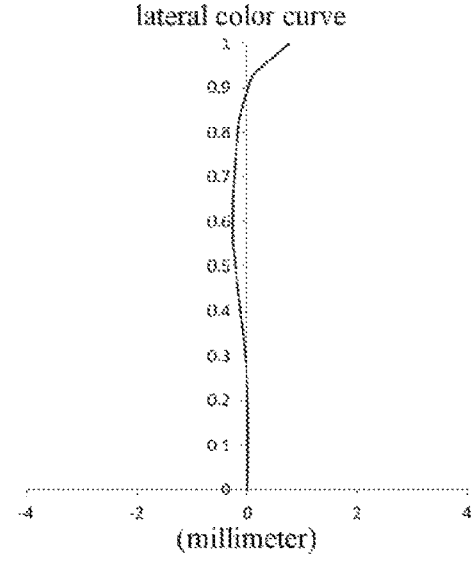

FIG. 2 illustrates the longitudinal aberration curve of the camera lens group according to Embodiment 1, representing deviations of focal points converged by lights of different wavelengths after passing through the optical system. FIG. 3 illustrates the astigmatic curve of the camera lens group according to Embodiment 1, representing a curvature of the tangential image plane and a curvature of the sagittal image plane. FIG. 4 illustrates the distortion curve of the camera lens group according to Embodiment 1, representing amounts of distortion at different viewing angles. FIG. 5 illustrates the lateral color curve of the camera lens group according to Embodiment 1, representing deviations of different image heights on the image plane after light passing through the camera lens group. In summary, with reference to FIGS. 2 to 5, the camera lens group according to Embodiment 1 is a camera lens group having a telephoto function, high resolution, and miniaturization.

Embodiment 2

A camera lens group according to Embodiment 2 of the present disclosure is described with reference to FIGS. 6 to 10.

FIG. 6 is a schematic structural diagram illustrating the camera lens group according to Embodiment 2. As shown in FIG. 6, the camera lens group includes five lenses. The five lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, and a fifth lens E5 having an object-side surface S9 and an image-side surface S10. The first to fifth lenses E1 to E5 are sequentially arranged from an object side to an image side of the camera lens group.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a negative refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

Table 4 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 4

| f1(mm) | 13.14 | f(mm) | 9.80 |
|---|---|---|---|
| f2(mm) | −6.93 | TTL(mm) | 10.66 |
| f3(mm) | 5.82 | ImgH (mm) | 2.75 |
| f4(mm) | −120.68 | | |
| f5(mm) | −43.26 | | |

Table 5 shows the surface type, the radius of curvature, the thickness, the refractive index, the abbe number and the conic coefficient of each lens of the camera lens group in the present embodiment. The units of the radius of curvature and the thickness are millimeters (mm).

TABLE 5

| surface number | surface type | radius of curvature | thickness | refractive index | abbe number | conic coefficient |
|---|---|---|---|---|---|---|
| OBJ | spherical | infinite | infinite | | | |
| S1 | aspheric | 2.8330 | 1.1917 | 1.55 | 56.1 | −0.3539 |
| S2 | aspheric | 3.9874 | 0.2980 | | | 0.7471 |
| STO | spherical | infinite | −0.0354 | | | |
| S3 | aspheric | 12.8271 | 0.3001 | 1.65 | 23.5 | −57.2010 |
| S4 | aspheric | 3.2838 | 0.7722 | | | −12.1273 |
| S5 | aspheric | 2.6215 | 1.2943 | 1.55 | 56.1 | −4.3092 |
| S6 | aspheric | 12.3740 | 0.6608 | | | 37.3256 |
| S7 | aspheric | 2.7476 | 0.8606 | 1.65 | 23.5 | −9.1631 |
| S8 | aspheric | 2.3281 | 0.9189 | | | −4.4172 |
| S9 | aspheric | −100.0000 | 0.4253 | 1.55 | 56.1 | −99.0000 |
| S10 | aspheric | 30.9686 | 0.6734 | | | −0.5846 |
| S11 | spherical | infinite | 0.3000 | 1.52 | 64.2 | |
| S12 | spherical | infinite | 3.0005 | | | |
| S13 | spherical | infinite | | | | |

Table 6 below shows the high-order coefficients applicable to the aspheric surfaces S1-S10 of the aspheric lenses in the present embodiment. The surface type of each aspheric surface may be defined by the formula (1) given in Embodiment 1.

TABLE 6

| surface number | A4 | A6 | A8 | A10 | A12 | A14 | A16 |
|---|---|---|---|---|---|---|---|
| S1 | −1.2737E−03 | −6.0226E−04 | 2.4644E−04 | −1.1998E−04 | 3.1541E−05 | −5.6787E−06 | 6.2369E−07 |
| S2 | 1.2452E−03 | −1.2023E−02 | 5.6387E−03 | −4.7102E−04 | −4.5340E−04 | 1.3404E−04 | −9.2986E−06 |
| S3 | 5.9966E−03 | −2.6727E−02 | 2.5657E−02 | −1.1135E−02 | 2.4021E−03 | −2.2363E−04 | 2.5190E−06 |
| S4 | 2.6127E−02 | −3.6581E−02 | 3.5090E−02 | −1.7808E−02 | 5.0459E−03 | −7.5293E−04 | 4.2452E−05 |
| S5 | 9.3889E−03 | −3.6369E−03 | 1.7415E−03 | 1.6291E−04 | −2.3663E−04 | 7.6923E−05 | −8.4395E−06 |
| S6 | −2.7610E−02 | 1.4095E−02 | −7.1683E−03 | 3.9383E−03 | −1.3708E−03 | 2.8228E−04 | −1.8734E−05 |
| S7 | 2.1410E−02 | −4.3866E−03 | 5.4495E−03 | −2.6551E−03 | 4.7109E−04 | 1.3993E−05 | −9.7132E−06 |
| S8 | 5.5526E−03 | 2.4196E−02 | −1.2476E−02 | 9.2229E−03 | −5.2300E−03 | 1.5603E−03 | −1.9003E−04 |

TABLE 6-continued

| surface number | A4 | A6 | A8 | A10 | A12 | A14 | A16 |
|---|---|---|---|---|---|---|---|
| S9 | −1.0584E−01 | 2.9748E−02 | −8.9992E−03 | 8.9701E−03 | −6.5637E−03 | 2.3894E−03 | −3.5403E−04 |
| S10 | −8.6042E−02 | 2.7477E−02 | −9.5758E−03 | 4.5007E−03 | −2.1601E−03 | 6.1344E−04 | −7.6528E−05 |

FIG. 7 illustrates the longitudinal aberration curve of the camera lens group according to Embodiment 2, representing deviations of focal points converged by lights of different wavelengths after passing through the optical system. FIG. 8 illustrates the astigmatic curve of the camera lens group according to Embodiment 2, representing a curvature of the tangential image plane and a curvature of the sagittal image plane. FIG. 9 illustrates the distortion curve of the camera lens group according to Embodiment 2, representing amounts of distortion at different viewing angles. FIG. 10 illustrates the lateral color curve of the camera lens group according to Embodiment 2, representing deviations of different image heights on the image plane after light passing through the camera lens group. In summary, with reference to FIGS. 7 to 10, the camera lens group according to Embodiment 2 is a camera lens group having a telephoto function, high resolution, and miniaturization.

Embodiment 3

A camera lens group according to Embodiment 3 of the present disclosure is described with reference to FIGS. 11 to 15.

Figure 11:
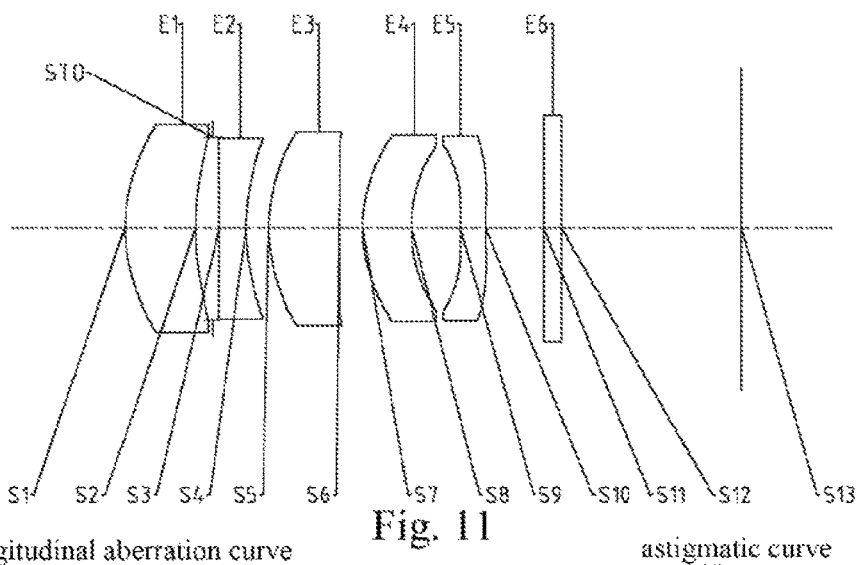
FIG. 11 is a schematic structural diagram illustrating a camera lens group according to Embodiment 3.

FIG. 11 is a schematic structural diagram illustrating the camera lens group according to Embodiment 3. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a concave surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a convex surface, and the image-side surface S10 of the fifth lens E5 may be a concave surface.

Table 7 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 7

| f1(mm) | 11.50 | f(mm) | 9.80 |
|---|---|---|---|
| f2(mm) | −5.58 | TTL(mm) | 10.31 |
| f3(mm) | 5.71 | ImgH (mm) | 2.70 |
| f4(mm) | 20.85 | | |
| f5(mm) | −14.65 | | |

Table 8 shows the surface type, the radius of curvature, the thickness, the refractive index, the abbe number and the conic coefficient of each lens of the camera lens group in the present embodiment. The units of the radius of curvature and the thickness are millimeters (mm).

TABLE 8

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.9984 | 1.1799 | 1.55 | 56.1 | −0.3382 |
| S2 | aspheric | 4.9404 | 0.2863 | | | 1.1046 |
| STO | spherical | infinite | 0.1096 | | | |
| S3 | aspheric | −1000.0000 | 0.4517 | 1.65 | 23.5 | −99.0000 |
| S4 | aspheric | 3.6131 | 0.3785 | | | −12.3913 |
| S5 | aspheric | 2.7199 | 1.1840 | 1.55 | 56.1 | −4.2456 |
| S6 | aspheric | 17.9765 | 0.3912 | | | 29.6259 |
| S7 | aspheric | 2.3541 | 0.8071 | 1.65 | 23.5 | −7.8307 |
| S8 | aspheric | 2.4703 | 0.8238 | | | −4.5592 |
| S9 | aspheric | 256.4472 | 0.4211 | 1.55 | 56.1 | 99.0000 |
| S10 | aspheric | 7.7509 | 0.9803 | | | −12.9725 |
| S11 | spherical | infinite | 0.3000 | 1.52 | 64.2 | |
| S12 | spherical | infinite | 3.0005 | | | |
| S13 | spherical | infinite | | | | |

Table 9 below shows the high-order coefficients applicable to the aspheric surfaces S1-S10 of the aspheric lenses in the present embodiment. The surface type of each aspheric surface may be defined by the formula (1) given in Embodiment 1.

TABLE 9

| surface number | A4 | A6 | A8 | A10 | A12 | A14 | A16 |
|---|---|---|---|---|---|---|---|
| S1 | −1.4663E−03 | 3.6819E−05 | −3.0719E−04 | 1.9143E−04 | −7.9376E−05 | 1.6041E−05 | −1.1162E−06 |
| S2 | −4.1447E−03 | −2.8371E−03 | −7.5792E−04 | 3.1509E−03 | −2.2071E−03 | 6.6593E−04 | −7.4304E−05 |
| S3 | 1.0644E−02 | −3.5425E−02 | 3.5993E−02 | −1.8356E−02 | 5.0396E−03 | −6.6110E−04 | 2.4888E−05 |
| S4 | 4.3975E−02 | −7.7206E−02 | 7.5210E−02 | −4.1748E−02 | 1.4066E−02 | −2.6625E−03 | 2.0948E−04 |
| S5 | 2.4509E−02 | −3.2913E−02 | 2.4269E−02 | −9.6522E−03 | 2.6459E−03 | −4.3548E−04 | 3.1351E−05 |
| S6 | −3.1501E−02 | 1.6795E−02 | −1.2555E−02 | 9.2182E−03 | −3.9337E−03 | 9.5492E−04 | −9.1352E−05 |
| S7 | 3.1961E−02 | −1.0075E−02 | 1.1403E−02 | −7.1440E−03 | 2.6104E−03 | −5.7931E−04 | 5.5237E−05 |
| S8 | 1.5146E−03 | 2.9108E−02 | −1.1126E−02 | 4.2260E−03 | −1.3510E−03 | 8.0666E−05 | −3.5993E−05 |
| S9 | −1.3251E−01 | 3.6981E−02 | 6.2850E−03 | −1.3727E−02 | 7.0968E−03 | −1.6229E−03 | 5.7969E−05 |
| S10 | −1.0189E−01 | 4.0825E−02 | −7.9663E−03 | −3.4180E−03 | 3.2525E−03 | −1.0785E−03 | 1.3703E−04 |

Figure 12:
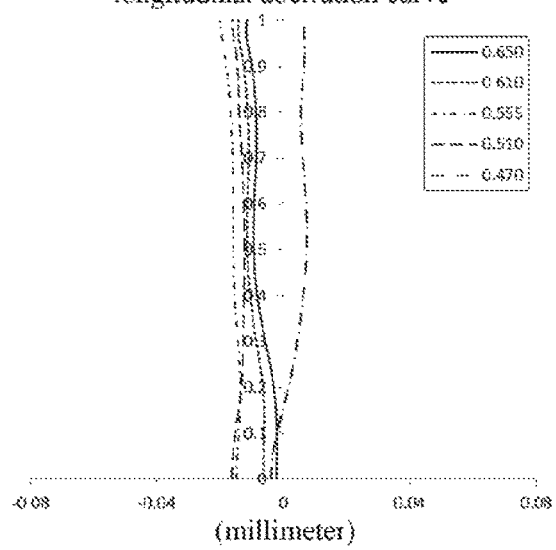
FIGS. 12-15 respectively illustrate a longitudinal aberration curve, an astigmatic curve, a distortion curve and a lateral color curve of the camera lens group according to Embodiment 3.
Figure 13:
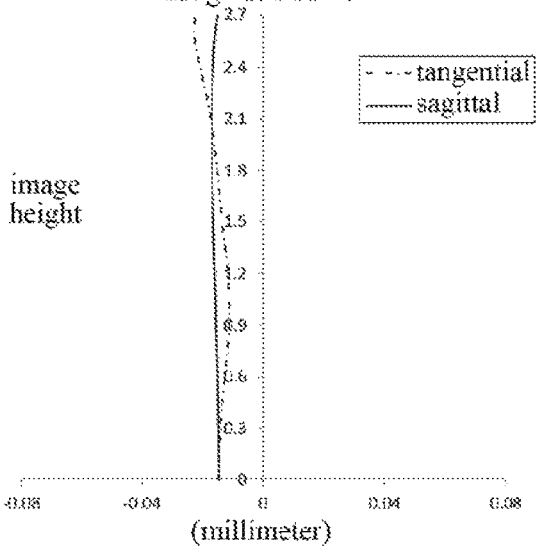
Figure 14:
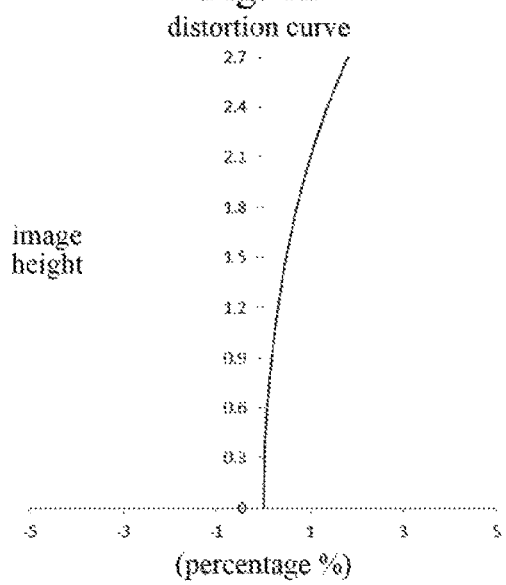
Figure 15:
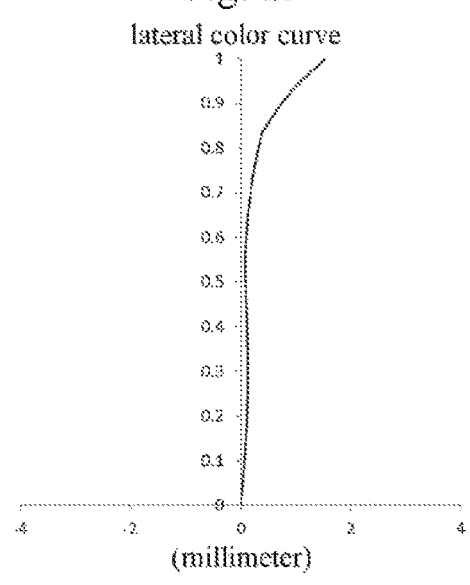

FIG. 12 illustrates the longitudinal aberration curve of the camera lens group according to Embodiment 3, representing deviations of focal points converged by lights of different wavelengths after passing through the optical system. FIG. 13 illustrates the astigmatic curve of the camera lens group according to Embodiment 3, representing a curvature of the tangential image plane and a curvature of the sagittal image plane. FIG. 14 illustrates the distortion curve of the camera lens group according to Embodiment 3, representing amounts of distortion at different viewing angles. FIG. 15 illustrates the lateral color curve of the camera lens group according to Embodiment 3, representing deviations of different image heights on the image plane after light passing through the camera lens group. In summary, with reference to FIGS. 12 to 15, the camera lens group according to Embodiment 3 is a camera lens group having a telephoto function, high resolution, and miniaturization.

Embodiment 4

A camera lens group according to Embodiment 4 of the present disclosure is described with reference to FIGS. 16 to 20.

Figure 16:
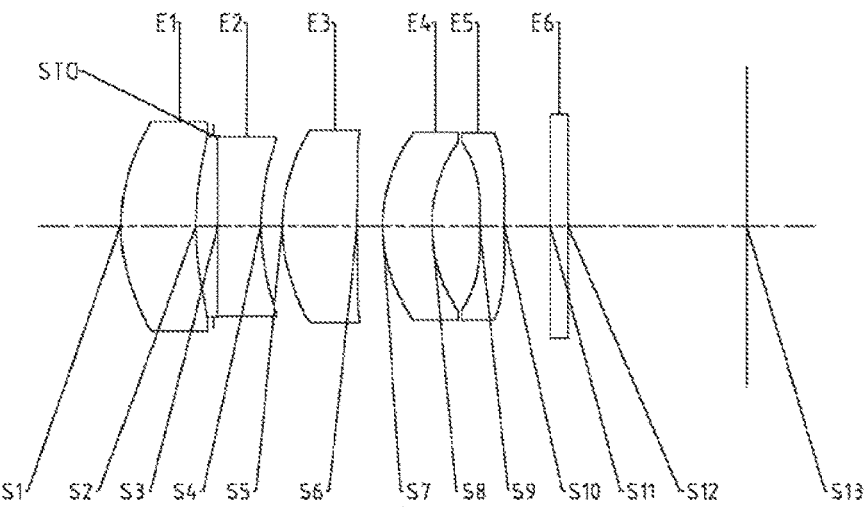
FIG. 16 is a schematic structural diagram illustrating a camera lens group according to Embodiment 4.

FIG. 16 is a schematic structural diagram illustrating the camera lens group according to Embodiment 4. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a concave surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

Table 10 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 10

| f1(mm) | 11.47 | f(mm) | 9.80 |
|---|---|---|---|
| f2(mm) | −5.55 | TTL(mm) | 10.51 |
| f3(mm) | 5.66 | ImgH (mm) | 2.70 |
| f4(mm) | 22.01 | | |
| f5(mm) | −15.19 | | |

Table 11 shows the surface type, the radius of curvature, the thickness, the refractive index, the abbe number and the conic coefficient of each lens of the camera lens group in the present embodiment. The units of the radius of curvature and the thickness are millimeters (mm).

TABLE 11

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 3.1239 | 1.2583 | 1.55 | 56.1 | −0.3175 |
| S2 | aspheric | 5.3461 | 0.2966 | | | 1.2171 |
| STO | spherical | infinite | 0.0728 | | | |
| S3 | aspheric | −1000.0000 | 0.7222 | 1.65 | 23.5 | −99.0000 |
| S4 | aspheric | 3.5931 | 0.3598 | | | −12.7089 |
| S5 | aspheric | 2.6474 | 1.2628 | 1.55 | 56.1 | −4.4454 |
| S6 | aspheric | 15.4425 | 0.4276 | | | 28.4659 |
| S7 | aspheric | 2.3555 | 0.8199 | 1.65 | 23.5 | −7.5794 |
| S8 | aspheric | 2.4391 | 0.8087 | | | −4.5167 |
| S9 | aspheric | −500.0000 | 0.4079 | 1.55 | 56.1 | 99.0000 |
| S10 | aspheric | 8.4328 | 0.7734 | | | −15.5602 |
| S11 | spherical | infinite | 0.3000 | 1.52 | 64.2 | |
| S12 | spherical | infinite | 3.0005 | | | |
| S13 | spherical | infinite | | | | |

Table 12 below shows the high-order coefficients applicable to the aspheric surfaces S1-S10 of the aspheric lenses in the present embodiment. The surface type of each aspheric surface may be defined by the formula (1) given in Embodiment 1.

TABLE 12

| surface number | A4 | A6 | A8 | A10 | A12 | A14 | A16 |
|---|---|---|---|---|---|---|---|
| S1 | −1.1542E−03 | −4.3984E−04 | 1.4723E−05 | 8.1513E−05 | −4.7346E−05 | 1.0477E−05 | −7.7105E−07 |
| S2 | −2.7880E−04 | −1.0574E−02 | 5.3973E−03 | 2.6072E−04 | −1.1944E−03 | 4.3757E−04 | −5.2836E−05 |
| S3 | 1.0900E−02 | −3.1569E−02 | 2.8726E−02 | −1.2931E−02 | 3.0365E−03 | −2.9986E−04 | −3.6318E−07 |
| S4 | 3.7915E−02 | −6.4216E−02 | 6.2022E−02 | −3.3945E−02 | 1.1355E−02 | −2.1671E−03 | 1.7471E−04 |
| S5 | 2.0436E−02 | −2.9047E−02 | 2.2715E−02 | −9.2946E−03 | 2.5915E−03 | −4.3227E−04 | 3.1268E−05 |
| S6 | −3.1660E−02 | 1.8170E−02 | −1.5413E−02 | 1.1466E−02 | −4.8374E−03 | 1.1563E−03 | −1.1075E−04 |
| S7 | 3.2363E−02 | −6.9111E−03 | 4.8251E−03 | −2.5309E−03 | 8.5359E−04 | −1.8961E−04 | 1.8052E−05 |
| S8 | 2.9524E−03 | 3.1984E−02 | −1.8927E−02 | 9.7630E−03 | −3.6534E−03 | 7.2793E−04 | −9.9066E−05 |
| S9 | −1.3906E−01 | 4.5246E−02 | 5.6938E−04 | −1.2050E−02 | 8.1435E−03 | −2.5227E−03 | 2.7006E−04 |
| S10 | −1.0853E−01 | 4.8004E−02 | −1.4031E−02 | 4.0677E−04 | 1.7892E−03 | −7.6216E−04 | 1.0718E−04 |

Figure 17:
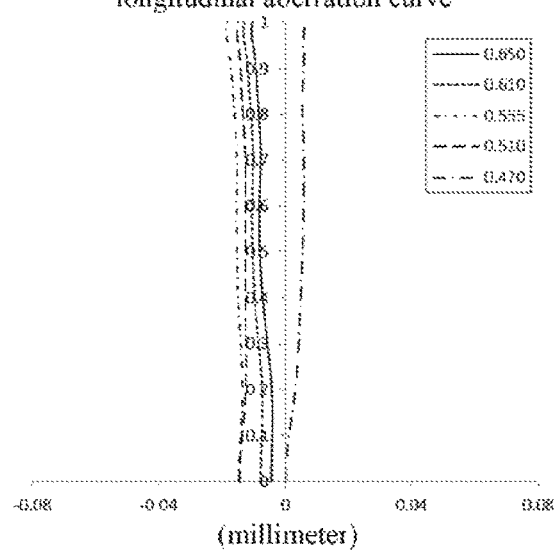
FIGS. 17-20 respectively illustrate a longitudinal aberration curve, an astigmatic curve, a distortion curve and a lateral color curve of the camera lens group according to Embodiment 4.
Figure 18:
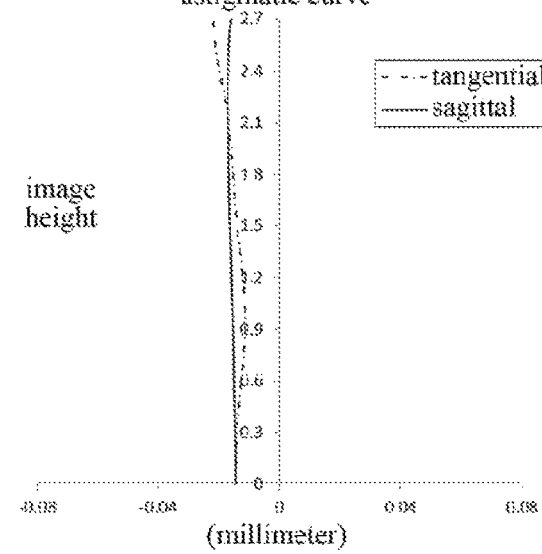
Figure 19:
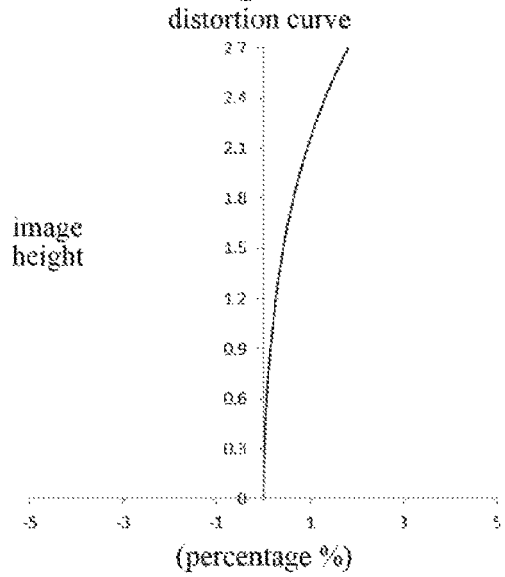
Figure 20:
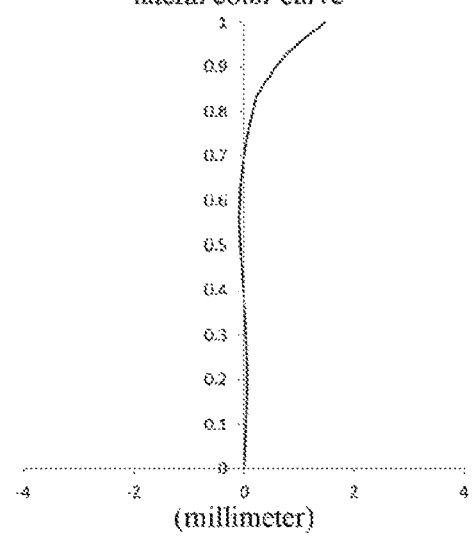

FIG. 17 illustrates the longitudinal aberration curve of the camera lens group according to Embodiment 4, representing deviations of focal points converged by lights of different wavelengths after passing through the optical system. FIG. 18 illustrates the astigmatic curve of the camera lens group according to Embodiment 4, representing a curvature of the tangential image plane and a curvature of the sagittal image plane. FIG. 19 illustrates the distortion curve of the camera lens group according to Embodiment 4, representing amounts of distortion at different viewing angles. FIG. 20 illustrates the lateral color curve of the camera lens group according to Embodiment 4, representing deviations of different image heights on the image plane after light passing through the camera lens group. In summary, with reference to FIGS. 17 to 20, the camera lens group according to Embodiment 4 is a camera lens group having a telephoto function, high resolution, and miniaturization.

Embodiment 5

A camera lens group according to Embodiment 5 of the present disclosure is described with reference to FIGS. 21 to 25.

Figure 21:
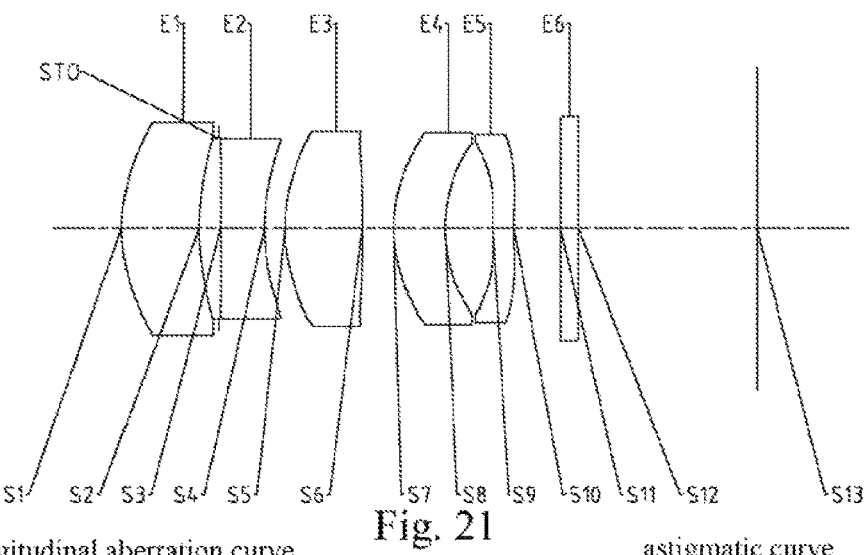
FIG. 21 is a schematic structural diagram illustrating a camera lens group according to Embodiment 5.

FIG. 21 is a schematic structural diagram illustrating the camera lens group according to Embodiment 5. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a convex surface, and the image-side surface S10 of the fifth lens E5 may be a concave surface.

Table 13 below shows the effective focal lengths f1 to f5 of the first lens E1 to the fifth E5, the total effective focal length f of the camera lens group, the total track length TTL of the camera lens group, and the half of the diagonal length ImgH (mm) of the effective pixel area on the image plane.

TABLE 13

| f1(mm) | 13.57 | f(mm) | 9.80 |
|---|---|---|---|
| f2(mm) | −5.66 | TTL(mm) | 10.68 |
| f3(mm) | 5.11 | ImgH (mm) | 2.70 |
| f4(mm) | 27.45 | | |
| f5(mm) | −14.26 | | |

Table 14 shows the surface type, the radius of curvature, the thickness, the refractive index, the abbe number and the conic coefficient of each lens of the camera lens group in the present embodiment. The units of the radius of curvature and the thickness are millimeters (mm).

TABLE 14

| surface number | surface type | radius of curvature | thickness | material refractive index | abbe number | conic coefficient |
|---|---|---|---|---|---|---|
| OBJ | spherical | infinite | infinite | | | |
| S1 | aspheric | 3.1291 | 1.3000 | 1.55 | 56.1 | −0.3031 |
| S2 | aspheric | 4.6229 | 0.3336 | | | 1.2508 |
| STO | spherical | infinite | 0.0299 | | | |
| S3 | aspheric | 110.9400 | 0.7359 | 1.65 | 23.5 | −99.0000 |
| S4 | aspheric | 3.5244 | 0.3473 | | | −12.2492 |
| S5 | aspheric | 2.7273 | 1.3000 | 1.55 | 56.1 | −4.8086 |
| S6 | aspheric | 100.0000 | 0.5333 | | | 99.0000 |
| S7 | aspheric | 2.4699 | 0.8566 | 1.65 | 23.5 | −7.5139 |
| S8 | aspheric | 2.4805 | 0.8046 | | | −4.5127 |
| S9 | aspheric | 43.2202 | 0.3535 | 1.55 | 56.1 | −99.0000 |

TABLE 14-continued

| surface number | surface type | radius of curvature | thickness | material refractive index | abbe number | conic coefficient |
|---|---|---|---|---|---|---|
| S10 | aspheric | 6.5775 | 0.7858 | | | −15.6704 |
| S11 | spherical | infinite | 0.3000 | 1.52 | 64.2 | |
| S12 | spherical | infinite | 3.0005 | | | |
| S13 | spherical | infinite | | | | |

Table 15 below shows the high-order coefficients applicable to the aspheric surfaces S1-S10 of the aspheric lenses in the present embodiment. The surface type of each aspheric surface may be defined by the formula (1) given in Embodiment 1.

TABLE 15

| surface number | A4 | A6 | A8 | A10 | A12 | A14 | A16 |
|---|---|---|---|---|---|---|---|
| S1 | −1.1343E−03 | −4.7918E−04 | 1.0531E−04 | 2.4398E−05 | −2.3811E−05 | 5.4611E−06 | −3.4137E−07 |
| S2 | −8.9460E−04 | −9.8986E−03 | 5.0383E−03 | 1.0144E−04 | −9.0047E−04 | 3.1100E−04 | −3.3576E−05 |
| S3 | 8.0172E−03 | −2.5080E−02 | 2.1746E−02 | −8.9409E−03 | 1.7795E−03 | −1.0876E−04 | −8.6911E−06 |
| S4 | 3.2097E−02 | −4.7789E−02 | 4.4147E−02 | −2.2767E−02 | 7.1345E−03 | −1.2933E−03 | 9.9772E−05 |
| S5 | 1.3628E−02 | −1.8181E−02 | 1.3894E−02 | −5.0348E−03 | 1.2749E−03 | −2.0117E−04 | 1.4128E−05 |
| S6 | −2.9539E−02 | 1.7380E−02 | −1.3080E−02 | 8.5059E−03 | −3.1840E−03 | 6.8575E−04 | −5.9139E−05 |
| S7 | 2.8619E−02 | −3.3371E−03 | 1.5140E−03 | −8.6499E−04 | 4.1400E−04 | −1.2815E−04 | 1.4846E−05 |
| S8 | 4.7691E−03 | 2.9775E−02 | −1.7839E−02 | 7.9951E−03 | −2.0150E−03 | 1.2806E−04 | −1.0032E−05 |
| S9 | −1.5255E−01 | 6.0021E−02 | −6.4929E−03 | −1.0790E−02 | 8.7483E−03 | −2.9166E−03 | 3.4458E−04 |
| S10 | −1.2268E−01 | 6.3762E−02 | −2.3911E−02 | 4.7795E−03 | 5.2733E−04 | −5.5730E−04 | 9.3093E−05 |

Figure 22:
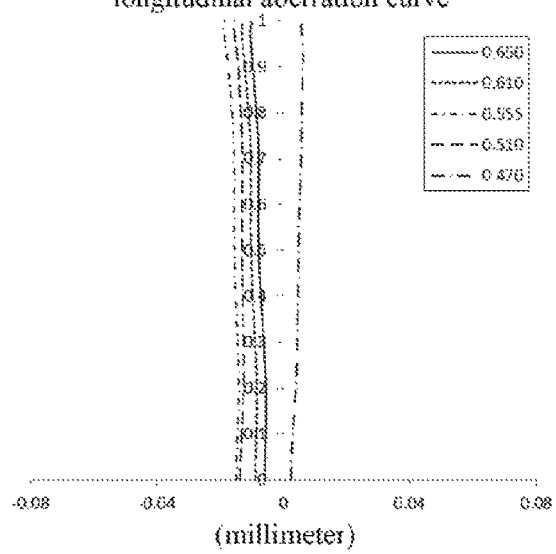
FIGS. 22-25 respectively illustrate a longitudinal aberration curve, an astigmatic curve, a distortion curve and a lateral color curve of the camera lens group according to Embodiment 5.
Figure 23:
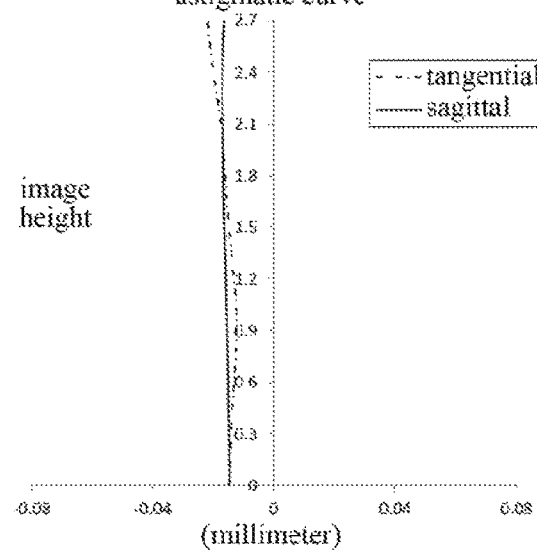
Figure 24:
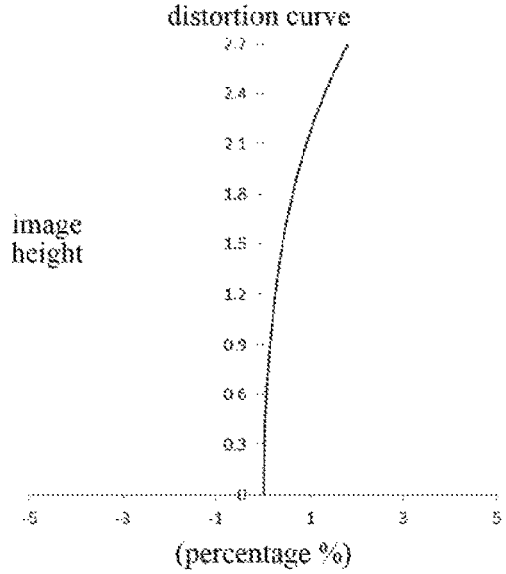
Figure 25:
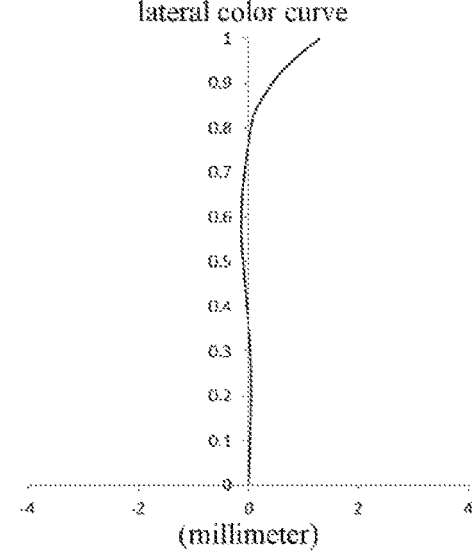

FIG. 22 illustrates the longitudinal aberration curve of the camera lens group according to Embodiment 5, representing deviations of focal points converged by lights of different wavelengths after passing through the optical system. FIG. 23 illustrates the astigmatic curve of the camera lens group according to Embodiment 5, representing a curvature of the tangential image plane and a curvature of the sagittal image plane. FIG. 24 illustrates the distortion curve of the camera lens group according to Embodiment 5, representing amounts of distortion at different viewing angles. FIG. 25 illustrates the lateral color curve of the camera lens group according to Embodiment 5, representing deviations of different image heights on the image plane after light passing through the camera lens group. In summary, with reference to FIGS. 22 to 25, the camera lens group according to Embodiment 5 is a camera lens group having a telephoto function, high resolution, and miniaturization.

Embodiment 6

A camera lens group according to Embodiment 6 of the present disclosure is described with reference to FIGS. 26 to 30.

Figure 26:
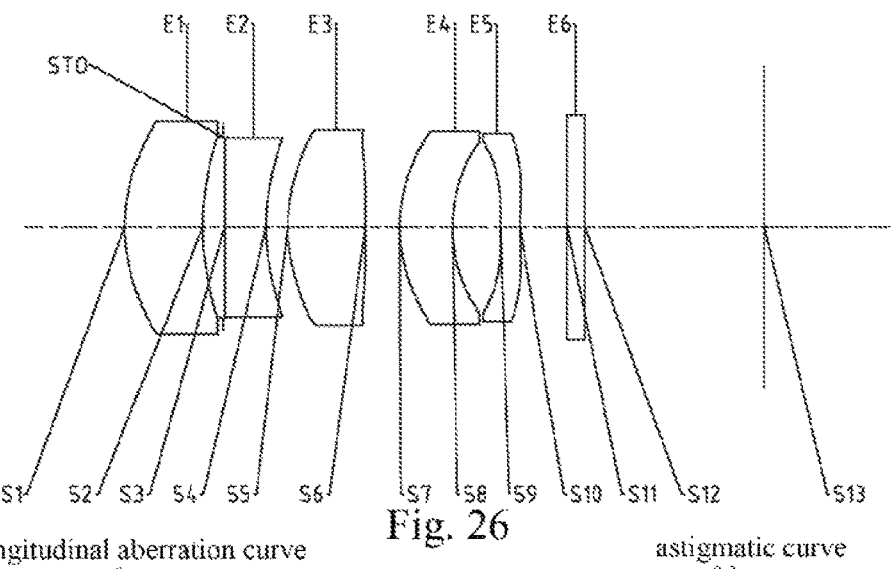
FIG. 26 is a schematic structural diagram illustrating a camera lens group according to Embodiment 6.

FIG. 26 is a schematic structural diagram illustrating the camera lens group according to Embodiment 6. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a convex surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a convex surface, and the image-side surface S10 of the fifth lens E5 may be a concave surface.

Table 16 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 16

| f1(mm) | 14.03 | f(mm) | 9.80 |
|---|---|---|---|
| f2(mm) | −5.77 | TTL(mm) | 10.70 |
| f3(mm) | 5.06 | ImgH (mm) | 2.70 |
| f4(mm) | 31.69 | | |
| f5(mm) | −14.44 | | |

Table 17 shows the surface type, the radius of curvature, the thickness, the refractive index, the abbe number and the conic coefficient of each lens of the camera lens group in the present embodiment. The units of the radius of curvature and the thickness are millimeters (mm).

TABLE 17

| surface number | surface type | radius of curvature | thickness | material refractive index | abbe number | conic coefficient |
|---|---|---|---|---|---|---|
| OBJ | spherical | infinite | infinite | | | |
| S1 | aspheric | 3.1216 | 1.3000 | 1.55 | 56.1 | −0.3067 |
| S2 | aspheric | 4.4945 | 0.3412 | | | 1.2145 |
| STO | spherical | infinite | 0.0264 | | | |
| S3 | aspheric | 76.2523 | 0.6912 | 1.65 | 23.5 | −99.0000 |
| S4 | aspheric | 3.5326 | 0.3669 | | | −12.2778 |
| S5 | aspheric | 2.7693 | 1.3000 | 1.55 | 56.1 | −4.9433 |
| S6 | aspheric | −1000.0000 | 0.5795 | | | −99.0000 |
| S7 | aspheric | 2.5355 | 0.8747 | 1.65 | 23.5 | −7.5321 |
| S8 | aspheric | 2.5034 | 0.8024 | | | −4.5763 |
| S9 | aspheric | 25.0724 | 0.3279 | 1.55 | 56.1 | −99.0000 |
| S10 | aspheric | 5.9705 | 0.7897 | | | −18.4953 |
| S11 | spherical | infinite | 0.3000 | 1.52 | 64.2 | |
| S12 | spherical | infinite | 3.0005 | | | |
| S13 | spherical | infinite | | | | |

Table 18 below shows the high-order coefficients applicable to the aspheric surfaces S1-S10 of the aspheric lenses in the present embodiment. The surface type of each aspheric surface may be defined by the formula (1) given in Embodiment 1.

TABLE 18

| surface number | A4 | A6 | A8 | A10 | A12 | A14 | A16 |
|---|---|---|---|---|---|---|---|
| S1 | −1.1708E−03 | −4.9420E−04 | 1.2669E−04 | 1.0018E−05 | −1.8468E−05 | 4.3867E−06 | −2.5168E−07 |
| S2 | −1.2775E−03 | −9.6127E−03 | 5.0255E−03 | −8.9399E−05 | −7.4239E−04 | 2.5652E−04 | −2.6548E−05 |
| S3 | 7.2290E−03 | −2.4207E−02 | 2.1126E−02 | −8.6784E−03 | 1.7350E−03 | −1.1629E−04 | −6.0769E−06 |
| S4 | 3.0190E−02 | −4.3239E−02 | 3.9412E−02 | −1.9906E−02 | 6.0817E−03 | −1.0787E−03 | 8.1566E−05 |
| S5 | 1.1432E−02 | −1.4261E−02 | 1.0458E−02 | −3.3808E−03 | 7.8851E−04 | −1.1989E−04 | 8.2960E−06 |
| S6 | −2.8324E−02 | 1.6307E−02 | −1.1880E−02 | 7.4878E−03 | −2.6996E−03 | 5.6089E−04 | −4.6299E−05 |
| S7 | 2.6281E−02 | −1.7685E−03 | 2.9615E−04 | −2.2821E−04 | 2.1617E−04 | −9.3205E−05 | 1.2299E−05 |
| S8 | 4.6231E−03 | 2.9496E−02 | −1.7742E−02 | 7.6168E−03 | −1.5598E−03 | −6.5503E−05 | 2.2562E−05 |
| S9 | −1.6193E−01 | 6.7830E−02 | −9.4926E−03 | −1.0916E−02 | 9.5142E−03 | −3.2591E−03 | 3.9775E−04 |
| S10 | −1.3031E−01 | 7.1650E−02 | −2.8717E−02 | 6.7204E−03 | 5.2921E−05 | −5.0398E−04 | 9.2025E−05 |

Figure 27:
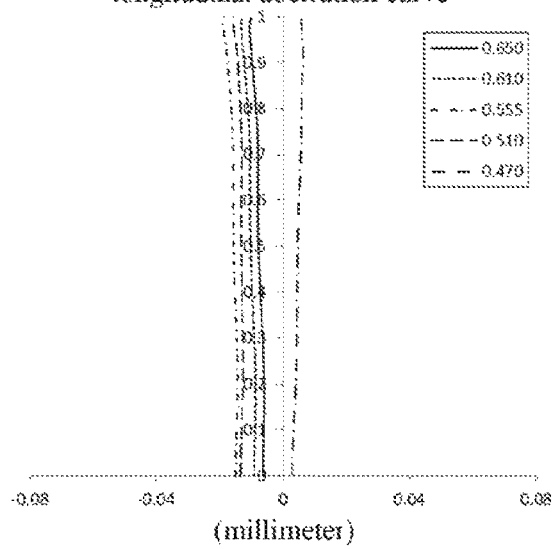
FIGS. 27-30 respectively illustrate a longitudinal aberration curve, an astigmatic curve, a distortion curve and a lateral color curve of the camera lens group according to Embodiment 6.
Figure 28:
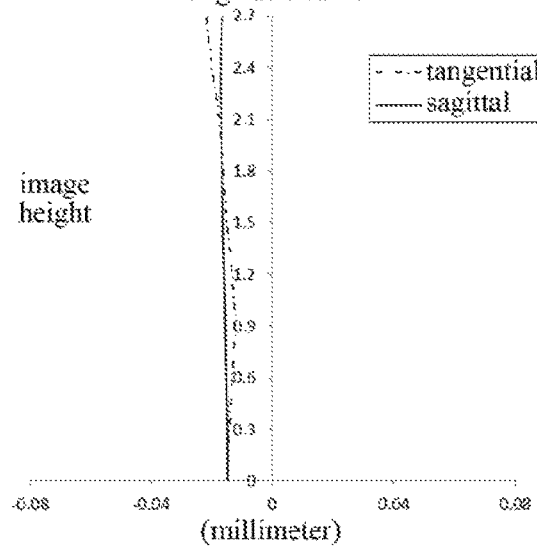
Figure 29:
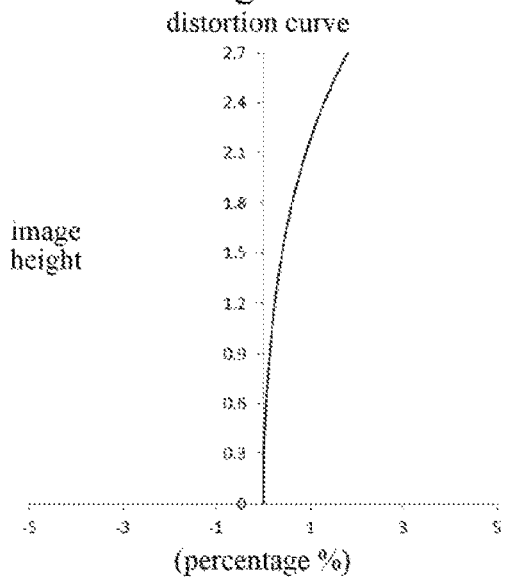
Figure 30:
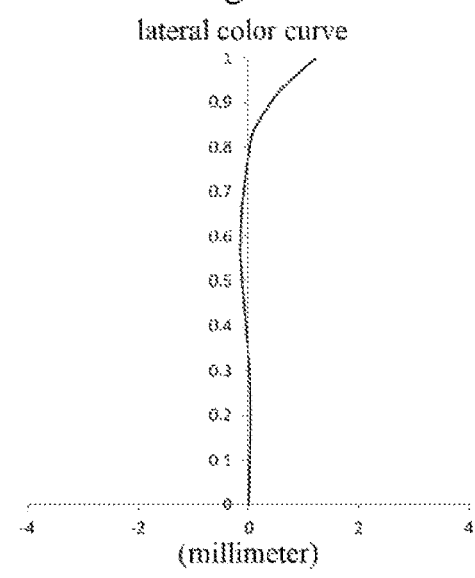

FIG. 27 illustrates the longitudinal aberration curve of the camera lens group according to Embodiment 6, representing deviations of focal points converged by lights of different wavelengths after passing through the optical system. FIG. 28 illustrates the astigmatic curve of the camera lens group according to Embodiment 6, representing a curvature of the tangential image plane and a curvature of the sagittal image plane. FIG. 29 illustrates the distortion curve of the camera lens group according to Embodiment 6, representing amounts of distortion at different viewing angles. FIG. 30 illustrates the lateral color curve of the camera lens group according to Embodiment 6, representing deviations of different image heights on the image plane after light passing through the camera lens group. In summary, with reference to FIGS. 27 to 30, the camera lens group according to Embodiment 6 is a camera lens group having a telephoto function, high resolution, and miniaturization.

Embodiment 7

A camera lens group according to Embodiment 7 of the present disclosure is described with reference to FIGS. 31 to 35.

Figure 31:
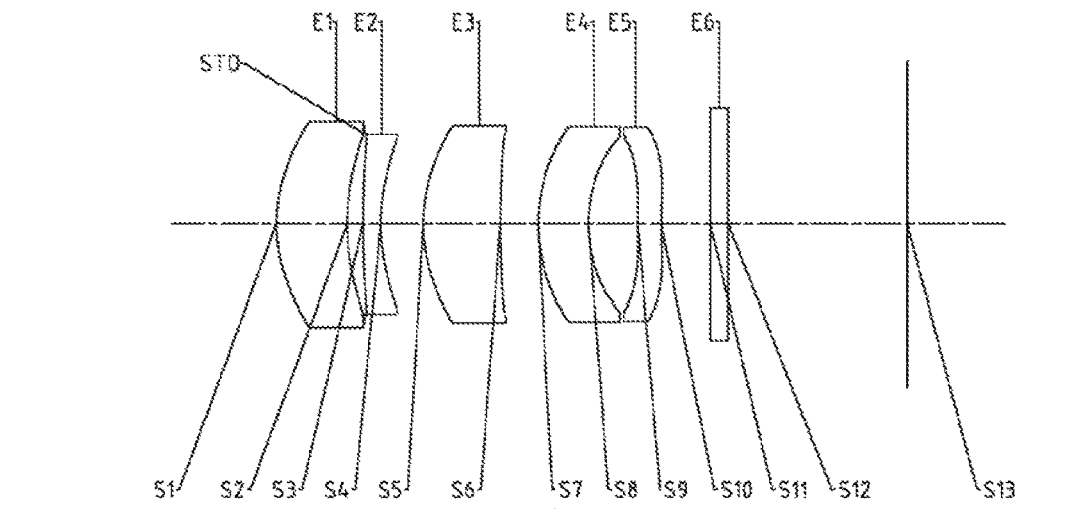
FIG. 31 is a schematic structural diagram illustrating a camera lens group according to Embodiment 7.

FIG. 31 is a schematic structural diagram illustrating the camera lens group according to Embodiment 7. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a negative refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a convex surface, and the image-side surface S10 of the fifth lens E5 may be a concave surface.

Table 19 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 19

| f1(mm) | 13.02 | f(mm) | 9.80 |
|---|---|---|---|
| f2(mm) | −6.75 | TTL(mm) | 10.58 |
| f3(mm) | 5.85 | ImgH (mm) | 2.75 |

TABLE 19-continued

| f4(mm) | −159801.59 |
|---|---|
| f5(mm) | −37.01 |

Table 20 shows the surface type, the radius of curvature, the thickness, the refractive index, the abbe number and the conic coefficient of each lens of the camera lens group in the present embodiment. The units of the radius of curvature and the thickness are millimeters (mm).

TABLE 20

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.8271 | 1.1821 | 1.55 | 56.1 | −0.3560 |
| S2 | aspheric | 4.0009 | 0.2981 | | | 0.7559 |
| STO | spherical | infinite | −0.0309 | | | |
| S3 | aspheric | 13.6799 | 0.3000 | 1.65 | 23.5 | −60.4395 |
| S4 | aspheric | 3.2729 | 0.7120 | | | −12.0511 |
| S5 | aspheric | 2.6111 | 1.3000 | 1.55 | 56.1 | −4.2632 |
| S6 | aspheric | 11.7882 | 0.6385 | | | 35.8545 |
| S7 | aspheric | 2.6986 | 0.8343 | 1.65 | 23.5 | −8.8469 |
| S8 | aspheric | 2.3715 | 0.8293 | | | −4.3139 |
| S9 | aspheric | 13.5549 | 0.3947 | 1.55 | 56.1 | 61.9233 |
| S10 | aspheric | 8.0288 | 0.8262 | | | −29.2172 |
| S11 | spherical | infinite | 0.3000 | 1.52 | 64.2 | |
| S12 | spherical | infinite | 3.0005 | | | |
| S13 | spherical | infinite | | | | |

Table 21 below shows the high-order coefficients applicable to the aspheric surfaces S1-S10 of the aspheric lenses in the present embodiment. The surface type of each aspheric surface may be defined by the formula (1) given in Embodiment 1.

TABLE 21

| surface number | A4 | A6 | A8 | A10 | A12 | A14 | A16 |
|---|---|---|---|---|---|---|---|
| S1 | −1.2228E−03 | −6.4856E−04 | 2.7599E−04 | −1.3612E−04 | 3.8427E−05 | −8.1448E−06 | 9.6306E−07 |
| S2 | 1.4120E−03 | −1.2662E−02 | 6.5835E−03 | −1.4770E−03 | 3.3628E−04 | −1.9308E−04 | 4.1723E−05 |
| S3 | 7.6914E−03 | −3.0230E−02 | 2.8106E−02 | −1.1897E−02 | 2.6137E−03 | −3.2621E−04 | 2.4463E−05 |
| S4 | 2.8777E−02 | −4.0881E−02 | 3.7327E−02 | −1.7678E−02 | 4.4939E−03 | −5.5818E−04 | 2.0137E−05 |
| S5 | 9.9337E−03 | −3.9118E−03 | 1.2140E−03 | 7.5081E−04 | −4.4128E−04 | 1.0923E−04 | −1.0673E−05 |
| S6 | −2.7777E−02 | 1.5305E−02 | −1.0233E−02 | 6.4882E−03 | −2.4403E−03 | 5.3344E−04 | −4.4912E−05 |
| S7 | 2.3124E−02 | −1.7722E−03 | 1.7998E−03 | −5.2137E−04 | −1.7431E−04 | 1.1775E−04 | −1.7284E−05 |
| S8 | 1.8426E−03 | 3.3161E−02 | −2.0267E−02 | 1.3323E−02 | −6.4799E−03 | 1.7582E−03 | −2.0271E−04 |
| S9 | −1.2528E−01 | 3.9677E−02 | −9.1103E−03 | 4.6724E−03 | −3.6928E−03 | 1.5012E−03 | −2.4836E−04 |
| S10 | −9.6355E−02 | 3.7187E−02 | −1.3187E−02 | 4.7179E−03 | −1.8616E−03 | 5.0313E−04 | −6.4479E−05 |

Figure 32:
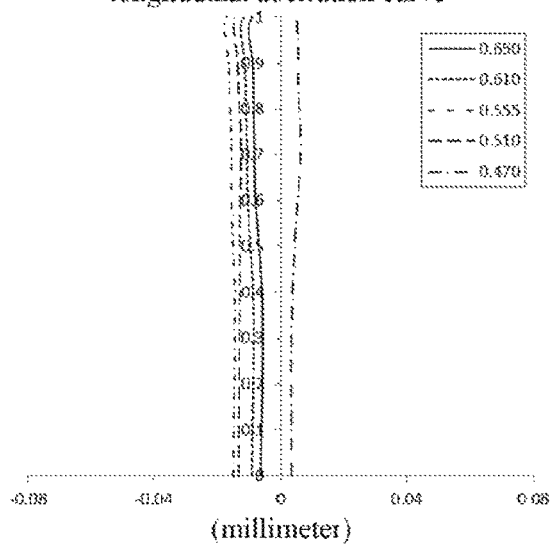
FIGS. 32-35 respectively illustrate a longitudinal aberration curve, an astigmatic curve, a distortion curve and a lateral color curve of the camera lens group according to Embodiment 7.
Figure 33:
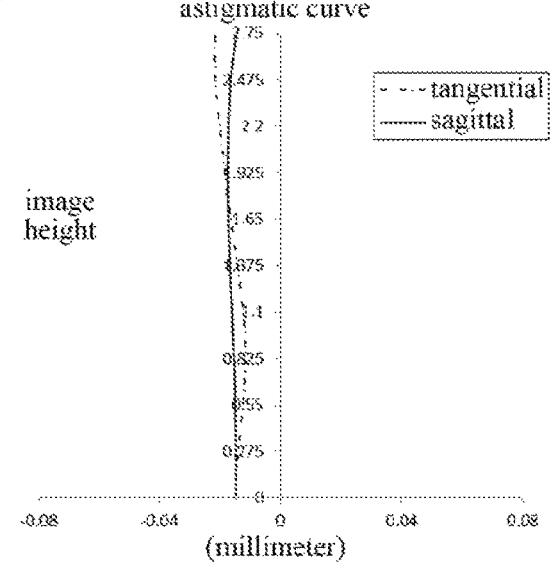
Figure 34:
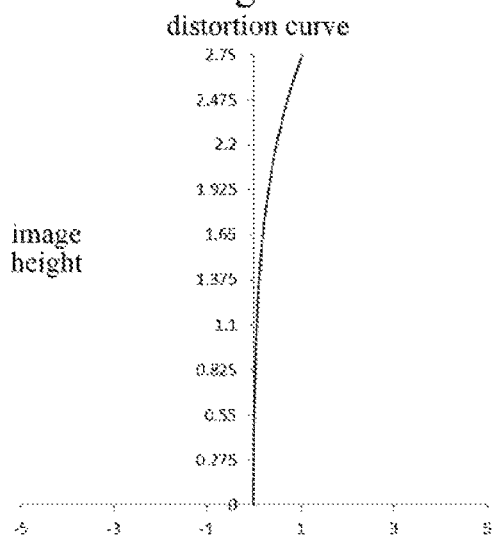
Figure 35:
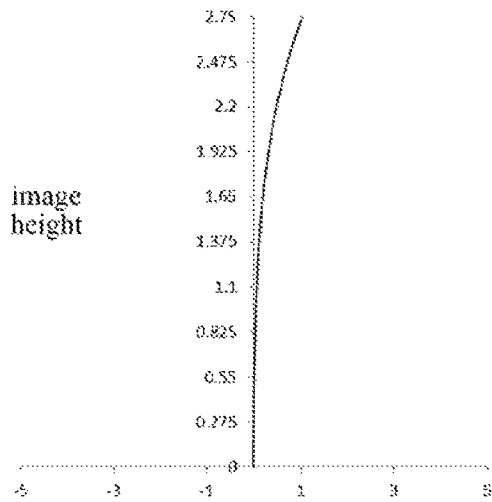

FIG. 32 illustrates the longitudinal aberration curve of the camera lens group according to Embodiment 7, representing deviations of focal points converged by lights of different wavelengths after passing through the optical system. FIG. 33 illustrates the astigmatic curve of the camera lens group according to Embodiment 7, representing a curvature of the tangential image plane and a curvature of the sagittal image plane. FIG. 34 illustrates the distortion curve of the camera lens group according to Embodiment 7, representing amounts of distortion at different viewing angles. FIG. 35 illustrates the lateral color curve of the camera lens group according to Embodiment 7, representing deviations of different image heights on the image plane after light passing through the camera lens group. In summary, with reference to FIGS. 31 to 35, the camera lens group according to Embodiment 7 is a camera lens group having a telephoto function, high resolution, and miniaturization.

Embodiment 8

A camera lens group according to Embodiment 8 of the present disclosure is described with reference to FIGS. 36 to 40.

Figure 36:
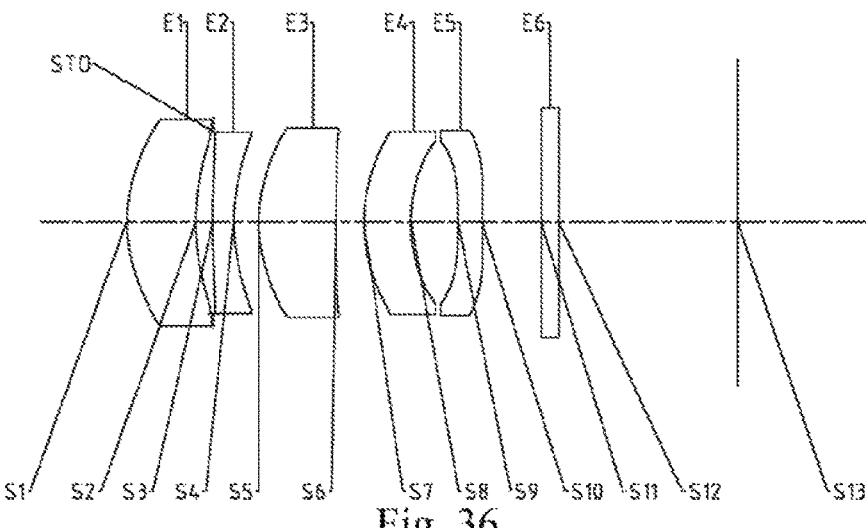
FIG. 36 is a schematic structural diagram illustrating a camera lens group according to Embodiment 8.

FIG. 36 is a schematic structural diagram illustrating the camera lens group according to Embodiment 8. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a concave surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

Table 22 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 22

| f1(mm) | 12.77 | f(mm) | 9.80 |
|---|---|---|---|
| f2(mm) | −5.85 | TTL(mm) | 10.26 |
| f3(mm) | 5.39 | ImgH (mm) | 2.75 |
| f4(mm) | 25.61 | | |
| f5(mm) | −15.62 | | |

Table 23 shows the surface type, the radius of curvature, the thickness, the refractive index, the abbe number and the conic coefficient of each lens of the camera lens group in the present embodiment. The units of the radius of curvature and the thickness are millimeters (mm).

TABLE 23

| surface number | surface type | radius of curvature | thickness | refractive index | abbe number | conic coefficient |
|---|---|---|---|---|---|---|
| OBJ | spherical | infinite | infinite | | | |
| S1 | aspheric | 2.8045 | 1.1527 | 1.55 | 56.1 | −0.3718 |
| S2 | aspheric | 4.0104 | 0.3012 | | | 0.7672 |
| STO | spherical | infinite | −0.0134 | | | |
| S3 | aspheric | 17.5777 | 0.3500 | 1.65 | 23.5 | −84.5367 |
| S4 | aspheric | 3.0793 | 0.4226 | | | −11.4889 |
| S5 | aspheric | 2.4986 | 1.3000 | 1.55 | 56.1 | −4.1145 |
| S6 | aspheric | 13.4849 | 0.4730 | | | 26.6382 |
| S7 | aspheric | 2.5734 | 0.7800 | 1.65 | 23.5 | −8.4843 |
| S8 | aspheric | 2.6866 | 0.7922 | | | −4.1413 |
| S9 | aspheric | −93.9355 | 0.4026 | 1.55 | 56.1 | −99.0000 |
| S10 | aspheric | 9.3940 | 0.9937 | | | −33.3149 |
| S11 | spherical | infinite | 0.3000 | 1.52 | 64.2 | |
| S12 | spherical | infinite | 3.0005 | | | |
| S13 | spherical | infinite | | | | |

Table 24 below shows the high-order coefficients applicable to the aspheric surfaces S1-S10 of the aspheric lenses in the present embodiment. The surface type of each aspheric surface may be defined by the formula (1) given in Embodiment 1.

TABLE 24

| surface number | A4 | A6 | A8 | A10 | A12 | A14 | A16 |
|---|---|---|---|---|---|---|---|
| S1 | −1.0760E−03 | −7.0730E−04 | 3.3708E−04 | −2.3024E−04 | 8.1544E−05 | −1.9269E−05 | 2.1265E−06 |
| S2 | −6.9804E−05 | −1.0905E−02 | 6.5378E−03 | −1.6697E−03 | 1.0610E−04 | −4.4447E−05 | 2.1348E−05 |
| S3 | 9.1543E−03 | −3.7379E−02 | 3.8589E−02 | −1.9837E−02 | 5.7962E−03 | −9.6394E−04 | 7.5444E−05 |
| S4 | 4.1278E−02 | −6.6340E−02 | 6.2905E−02 | −3.4093E−02 | 1.1279E−02 | −2.1187E−03 | 1.6494E−04 |
| S5 | 1.6699E−02 | −1.5209E−02 | 8.0265E−03 | −1.1502E−03 | −4.6943E−05 | 5.2476E−05 | −9.4155E−06 |
| S6 | −2.9470E−02 | 1.3754E−02 | −1.4176E−02 | 1.3564E−02 | −6.8897E−03 | 1.9562E−03 | −2.3301E−04 |
| S7 | 3.1083E−02 | −9.0140E−03 | 2.4295E−03 | 3.3006E−03 | −3.0433E−03 | 1.0586E−03 | −1.4931E−04 |
| S8 | 6.0083E−03 | 2.7624E−02 | −2.1511E−02 | 2.1286E−02 | −1.3433E−02 | 4.7234E−03 | −7.8434E−04 |
| S9 | −1.2523E−01 | 4.0339E−02 | −1.1488E−02 | 6.8100E−03 | −4.8916E−03 | 1.6573E−03 | −2.6075E−04 |
| S10 | −9.8316E−02 | 3.7294E−02 | −1.0846E−02 | 1.0613E−03 | 5.3347E−04 | −3.4257E−04 | 5.9797E−05 |

Figure 37:
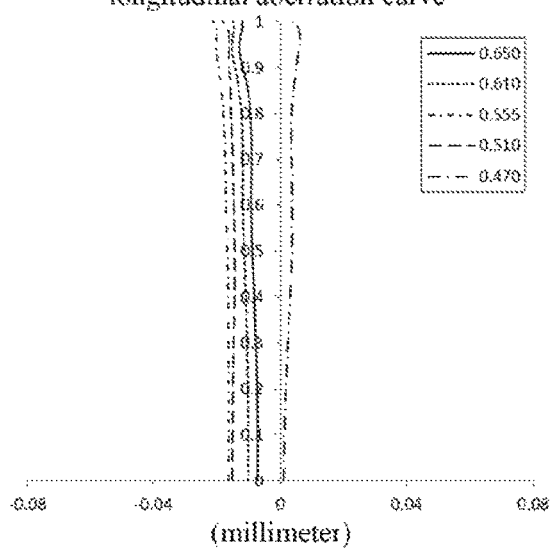
FIGS. 37-40 respectively illustrate a longitudinal aberration curve, an astigmatic curve, a distortion curve and a lateral color curve of the camera lens group according to Embodiment 8.
Figure 38:
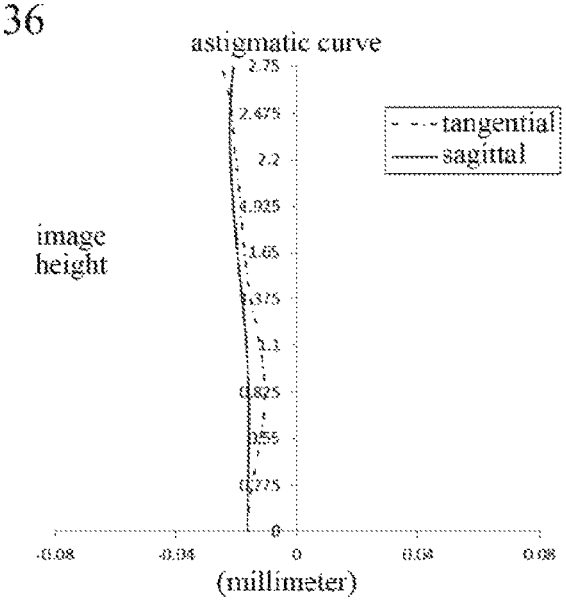
Figure 39:
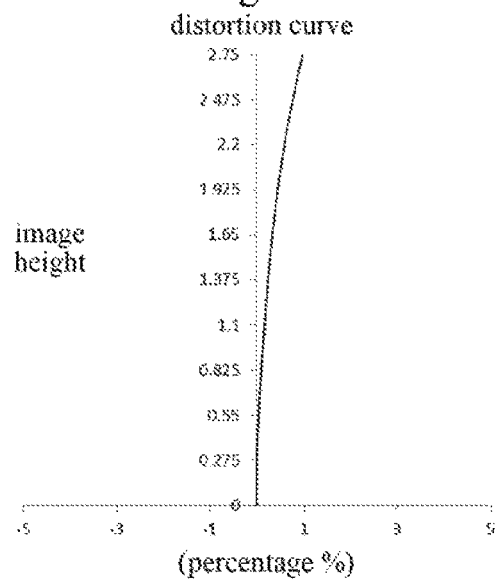
Figure 40:
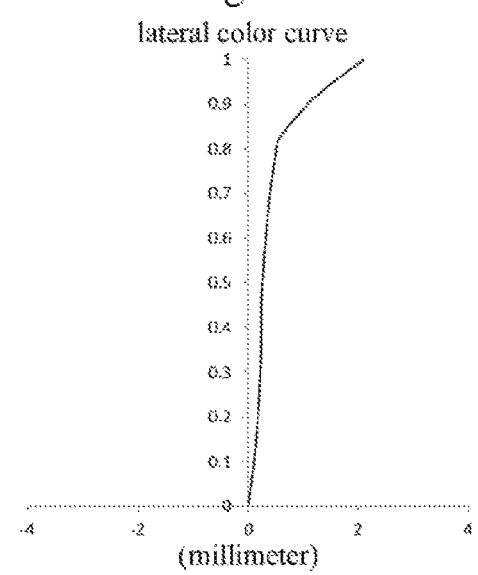

FIG. 37 illustrates the longitudinal aberration curve of the camera lens group according to Embodiment 8, representing deviations of focal points converged by lights of different wavelengths after passing through the optical system. FIG. 38 illustrates the astigmatic curve of the camera lens group according to Embodiment 8, representing a curvature of the tangential image plane and a curvature of the sagittal image plane. FIG. 39 illustrates the distortion curve of the camera lens group according to Embodiment 8, representing amounts of distortion at different viewing angles. FIG. 40 shows the lateral color curve of the camera lens group according to Embodiment 8, representing deviations of different image heights on the image plane after light passing through the camera lens group. In summary, with reference to FIGS. 36 to 40, the camera lens group according to Embodiment 8 is a camera lens group having a telephoto function, high resolution, and miniaturization.

Embodiment 9

A camera lens group according to Embodiment 9 of the present disclosure is described with reference to FIGS. 41 to 45.

Figure 41:
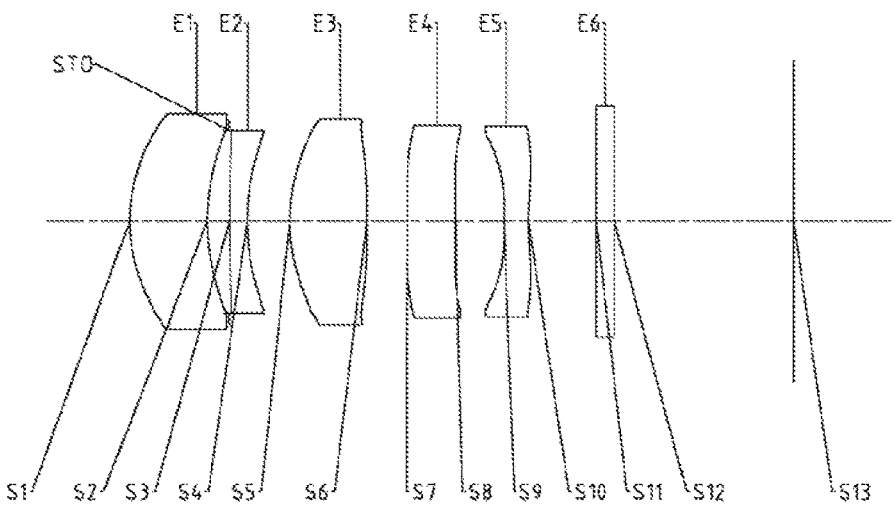
FIG. 41 is a schematic structural diagram illustrating a camera lens group according to Embodiment 9.

FIG. 41 is a schematic structural diagram illustrating the camera lens group according to Embodiment 9. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a convex surface. The fourth lens E4 may have a positive refractive power, the object-side surface S7 of the fourth lens E4 may be a convex surface, and the image-side surface S8 of the fourth lens E4 may be a convex surface. The fifth lens E5 may have a negative refractive power, the object-side surface S9 of the fifth lens E5 may be a concave surface, and the image-side surface S10 of the fifth lens E5 may be a concave surface.

Table 25 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 25

| f1(mm) | 14.95 | f(mm) | 10.62 |
|---|---|---|---|
| f2(mm) | −7.24 | TTL(mm) | 11.72 |
| f3(mm) | 4.68 | ImgH (mm) | 2.70 |
| f4(mm) | 34.89 | | |
| f5(mm) | −7.22 | | |

Table 26 shows the surface type, the radius of curvature, the thickness, the refractive index, the abbe number and the conic coefficient of each lens of the camera lens group in the present embodiment. The units of the radius of curvature and the thickness are millimeters (mm).

Figure 42:
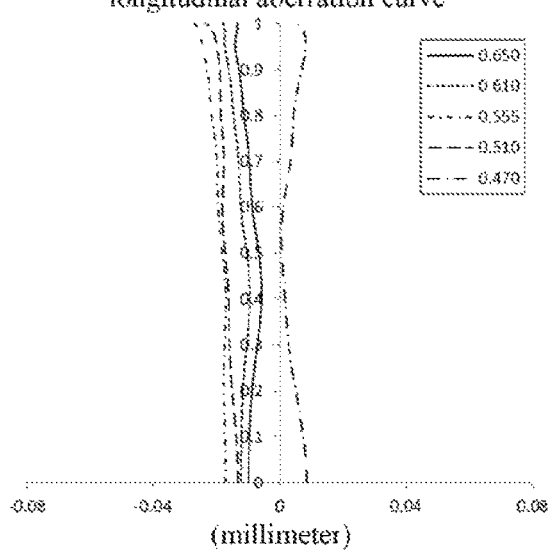
FIGS. 42-45 respectively illustrate a longitudinal aberration curve, an astigmatic curve, a distortion curve and a lateral color curve of the camera lens group according to Embodiment 9.
Figure 43:
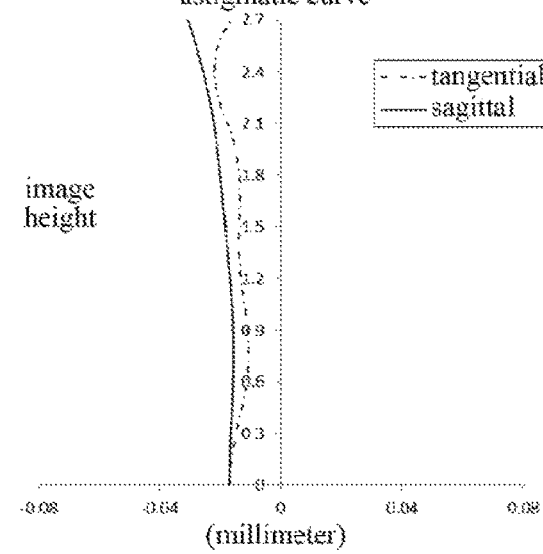
Figure 44:
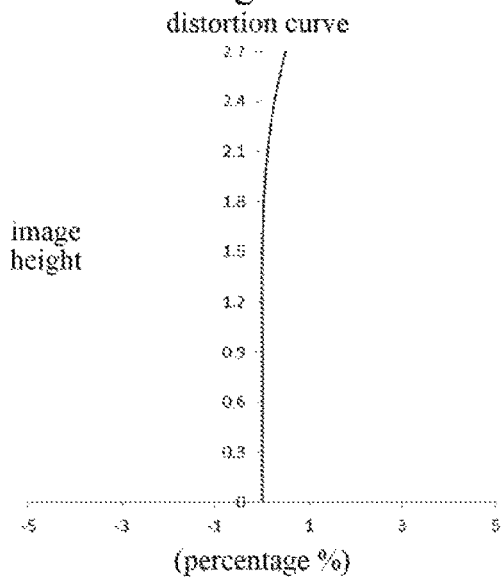
Figure 45:
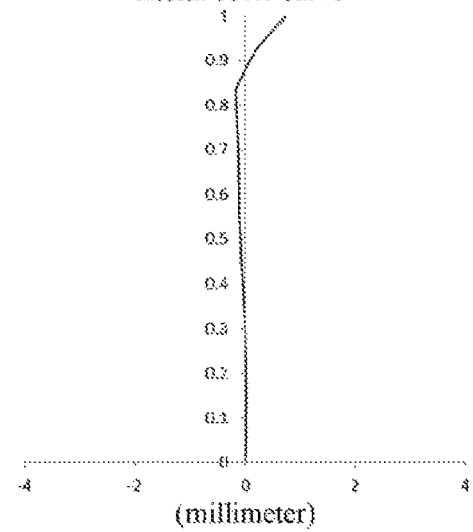

FIG. 42 illustrates the longitudinal aberration curve of the camera lens group according to Embodiment 9, representing deviations of focal points converged by lights of different wavelengths after passing through the optical system. FIG. 43 illustrates the astigmatic curve of the camera lens group according to Embodiment 9, representing a curvature of the tangential image plane and a curvature of the sagittal image plane. FIG. 44 illustrates the distortion curve of the camera lens group according to Embodiment 9, representing amounts of distortion at different viewing angles. FIG. 45 shows the lateral color curve of the camera lens group according to Embodiment 9, representing deviations of different image heights on the image plane after light passing through the camera lens group. In summary, with reference to FIGS. 41 to 45, the camera lens group according to Embodiment 9 is a camera lens group having a telephoto function, high resolution, and miniaturization.

Embodiment 10

A camera lens group according to Embodiment 10 of the present disclosure is described with reference to FIGS. 46 to 50.

Figure 46:
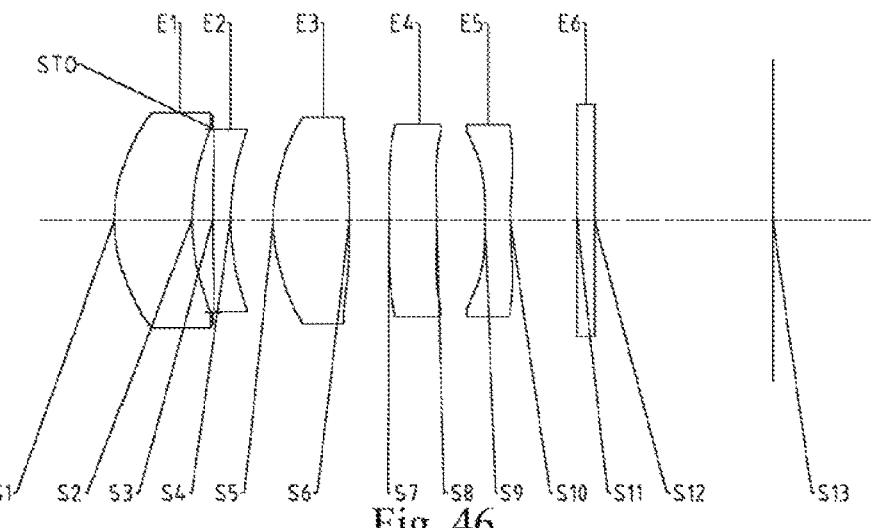
FIG. 46 is a schematic structural diagram illustrating a camera lens group according to Embodiment 10.

FIG. 46 is a schematic structural diagram illustrating the camera lens group according to Embodiment 10. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex

TABLE 26

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.8504 | 1.3000 | 1.55 | 56.1 | −0.2034 |
| S2 | aspheric | 3.6740 | 0.3662 | | | 1.0790 |
| STO | spherical | infinite | 0.0060 | | | |
| S3 | aspheric | 22.9126 | 0.3000 | 1.65 | 23.5 | −84.1342 |
| S4 | aspheric | 3.8586 | 0.7094 | | | −12.0913 |
| S5 | aspheric | 2.7523 | 1.2942 | 1.55 | 56.1 | −5.2105 |
| S6 | aspheric | −29.4584 | 0.6646 | | | 99.0000 |
| S7 | aspheric | 300.0000 | 0.8107 | 1.65 | 23.5 | −99.0000 |
| S8 | aspheric | −24.2857 | 0.8148 | | | 99.0000 |
| S9 | aspheric | −126.2160 | 0.4126 | 1.55 | 56.1 | 99.0000 |
| S10 | aspheric | 4.0739 | 1.1398 | | | −10.5677 |
| S11 | spherical | infinite | 0.3000 | 1.52 | 64.2 | |
| S12 | spherical | infinite | 3.0005 | | | |
| S13 | spherical | infinite | | | | |

Table 27 below shows the high-order coefficients applicable to the aspheric surfaces S1-S10 of the aspheric lenses in the present embodiment. The surface type of each aspheric surface may be defined by the formula (1) given in Embodiment 1.

TABLE 27

| surface number | A4 | A6 | A8 | A10 | A12 | A14 | A16 |
|---|---|---|---|---|---|---|---|
| S1 | −1.0598E−03 | −4.8789E−04 | 1.8785E−04 | −2.9895E−05 | 2.1494E−05 | −7.1572E−06 | 1.1340E−06 |
| S2 | −5.7556E−04 | −1.2216E−02 | 4.2673E−03 | 1.3140E−03 | −8.9410E−04 | 8.8556E−05 | 1.3786E−05 |
| S3 | 1.4271E−02 | −4.4193E−02 | 4.2263E−02 | −1.8582E−02 | 3.8377E−03 | −3.2878E−04 | 1.1827E−06 |
| S4 | 2.7446E−02 | −4.6342E−02 | 5.1172E−02 | −2.6083E−02 | 6.6358E−03 | −8.6532E−04 | 4.6228E−05 |
| S5 | 9.6073E−03 | −1.0274E−02 | 7.2818E−03 | −2.2513E−03 | 4.7795E−04 | −5.8269E−05 | 3.1397E−06 |
| S6 | −1.3406E−02 | −3.4463E−03 | 3.2550E−03 | −6.0148E−04 | 7.1444E−05 | 1.2569E−05 | −2.6437E−07 |
| S7 | 1.6930E−02 | 2.9510E−03 | −2.0922E−03 | 3.9233E−04 | −1.3661E−05 | 2.4798E−05 | −7.9001E−06 |
| S8 | 1.4943E−02 | 1.5614E−02 | −7.6088E−03 | 1.7442E−03 | −3.9250E−04 | 1.5175E−04 | −2.5302E−05 |
| S9 | −1.5447E−01 | 8.3940E−02 | −3.1478E−02 | 4.2029E−03 | 2.3674E−03 | −1.1252E−03 | 1.5261E−04 |
| S10 | −1.2779E−01 | 8.8480E−02 | −4.8767E−02 | 2.0064E−02 | −5.4647E−03 | 8.7618E−04 | −6.1886E−05 | surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a convex surface. The fourth lens E4 may have a positive refractive power, the object-side surface S7 of the fourth lens E4 may be a concave surface, and the image-side surface S8 of the fourth lens E4 may be a convex surface. The fifth lens E5 may have a negative refractive power, the object-side surface S9 of the fifth lens E5 may be a concave surface, and the image-side surface S10 of the fifth lens E5 may be a concave surface.

Table 28 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 28

| f1(mm) | 14.91 | f(mm) | 10.58 |
|---|---|---|---|
| f2(mm) | −7.29 | TTL(mm) | 11.09 |
| f3(mm) | 4.67 | ImgH (mm) | 2.70 |
| f4(mm) | 36.36 | | |
| f5(mm) | −7.20 | | |

Table 29 shows the surface type, the radius of curvature, the thickness, the refractive index, the abbe number and the conic coefficient of each lens of the camera lens group in the present embodiment. The units of the radius of curvature and the thickness are millimeters (mm).

TABLE 29

| surface number | surface type | radius of curvature | thickness | refractive index | abbe number | conic coefficient |
|---|---|---|---|---|---|---|
| OBJ | spherical | infinite | infinite | | | |
| S1 | aspheric | 2.8508 | 1.3000 | 1.55 | 56.1 | −0.2048 |
| S2 | aspheric | 3.6803 | 0.3480 | | | 1.0941 |
| STO | spherical | infinite | 0.0018 | | | |
| S3 | aspheric | 22.5128 | 0.3000 | 1.65 | 23.5 | −77.5951 |
| S4 | aspheric | 3.8661 | 0.7212 | | | −12.1671 |
| S5 | aspheric | 2.7611 | 1.2850 | 1.55 | 56.1 | −5.2132 |
| S6 | aspheric | −27.5815 | 0.6672 | | | 99.0000 |
| S7 | aspheric | −287.8928 | 0.7937 | 1.65 | 23.5 | 99.0000 |
| S8 | aspheric | −21.6960 | 0.8173 | | | 98.7691 |
| S9 | aspheric | −171.7499 | 0.4303 | 1.55 | 56.1 | −99.0000 |
| S10 | aspheric | 4.0269 | 1.1226 | | | −10.0071 |
| S11 | spherical | infinite | 0.3000 | 1.52 | 64.2 | |
| S12 | spherical | infinite | 3.0005 | | | |
| S13 | spherical | infinite | | | | |

Table 30 below shows the high-order coefficients applicable to the aspheric surfaces S1-S10 of the aspheric lenses in the present embodiment. The surface type of each aspheric surface may be defined by the formula (1) given in Embodiment 1

TABLE 30

| surface number | A4 | A6 | A8 | A10 | A12 | A14 | A16 |
|---|---|---|---|---|---|---|---|
| S1 | −1.0275E−03 | −5.4356E−04 | 2.2381E−04 | −4.2722E−05 | 2.3334E−05 | −7.2355E−06 | 1.1535E−06 |
| S2 | 1.9662E−04 | −1.3793E−02 | 5.5232E−03 | 9.8963E−04 | −9.4699E−04 | 1.2855E−04 | 8.2041E−06 |
| S3 | 1.3981E−02 | −4.5211E−02 | 4.5141E−02 | −2.1128E−02 | 4.9391E−03 | −5.7009E−04 | 2.2304E−05 |
| S4 | 2.6323E−02 | −4.5628E−02 | 5.2992E−02 | −2.8692E−02 | 8.0129E−03 | −1.2052E−03 | 7.9212E−05 |
| S5 | 9.2340E−03 | −9.8005E−03 | 7.3086E−03 | −2.5167E−03 | 6.1856E−04 | −8.8621E−05 | 5.6419E−06 |
| S6 | −1.3604E−02 | −3.1672E−03 | 3.3021E−03 | −8.3418E−04 | 2.0852E−04 | −2.1518E−05 | 2.9562E−06 |
| S7 | 1.6351E−02 | 3.2887E−03 | −2.2465E−03 | 2.4759E−04 | 1.2845E−04 | −1.4795E−05 | −4.2714E−06 |
| S8 | 1.4623E−02 | 1.5749E−02 | −7.7785E−03 | 1.7548E−03 | −3.6814E−04 | 1.6106E−04 | −2.9414E−05 |
| S9 | −1.4944E−01 | 7.9005E−02 | −2.9078E−02 | 3.7338E−03 | 2.2168E−03 | −1.0147E−03 | 1.3345E−04 |
| S10 | −1.2316E−01 | 8.3442E−02 | −4.5301E−02 | 1.8453E−02 | −4.9856E−03 | 7.9478E−04 | −5.6042E−05 |

Figure 47:
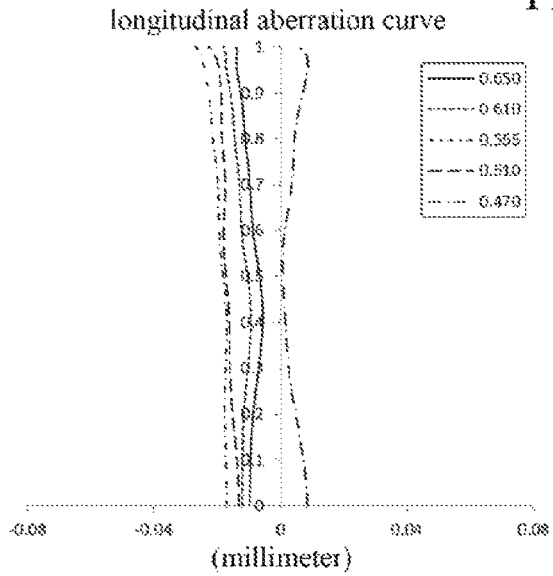
FIGS. 47-50 respectively illustrate a longitudinal aberration curve, an astigmatic curve, a distortion curve and a lateral color curve of the camera lens group according to Embodiment 10.
Figure 48:
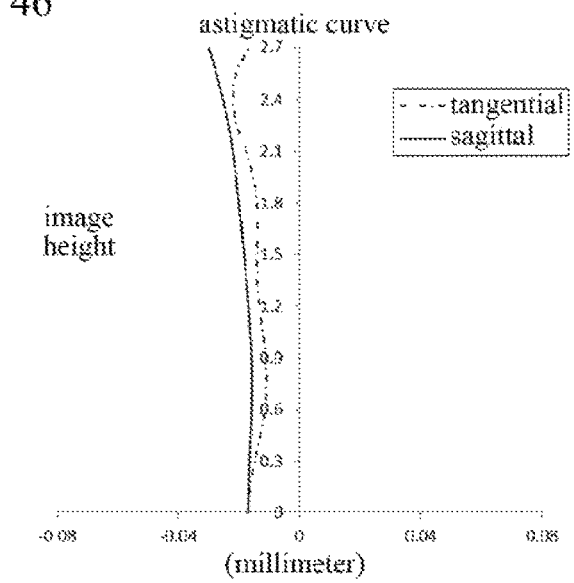
Figure 49:
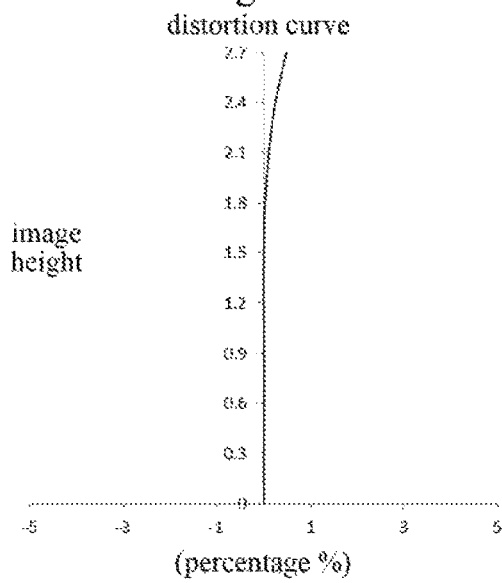
Figure 50:
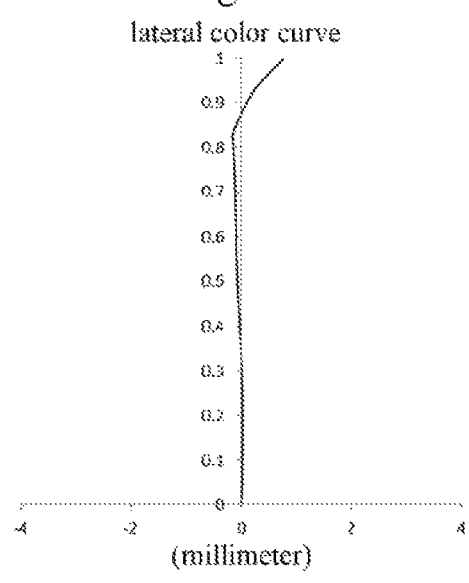

FIG. 47 illustrates the longitudinal aberration curve of the camera lens group according to Embodiment 10, resenting deviations of focal points converged by lights of different wavelengths after passing through the optical system. FIG. 48 illustrates the astigmatic curve of the camera lens group according to Embodiment 10, representing a curvature of the tangential image plane and a curvature of the sagittal image plane. FIG. 49 illustrates the distortion curve of the camera lens group according to Embodiment 10, representing amounts of distortion at different viewing angles. FIG. 50 illustrates the lateral color curve of the camera lens group according to Embodiment 10, representing deviations of different image heights on the image plane after light passing through the camera lens group. In summary, with reference to FIGS. 46 to 50, the camera lens group according to Embodiment 10 is a camera lens group having a telephoto function, high resolution, and miniaturization.

Embodiment 11

A camera lens group according to Embodiment 11 of the present disclosure is described with reference to FIGS. 51 to 55.

Figure 51:
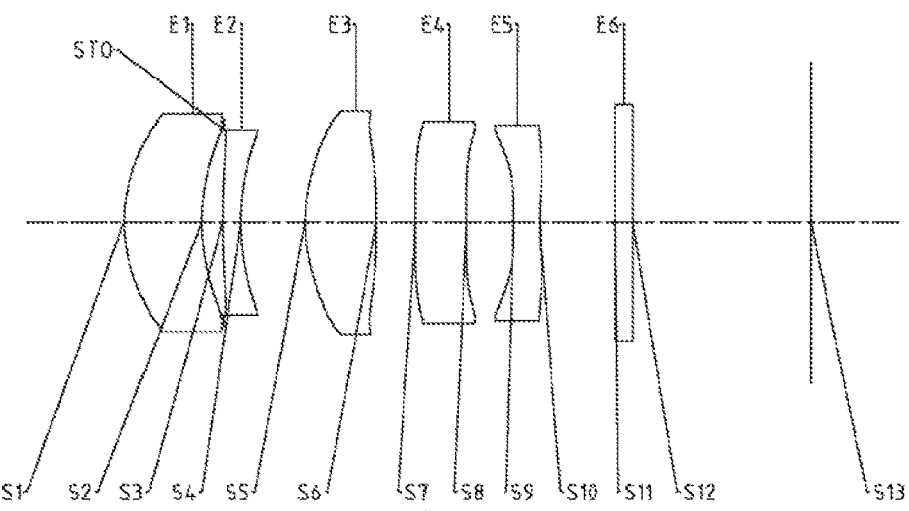
FIG. 51 is a schematic structural diagram illustrating a camera lens group according to Embodiment 11.

FIG. 51 is a schematic structural diagram illustrating the camera lens group according to Embodiment 11. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a positive refractive power, the object-side surface S5 of the third lens E3 may be a convex surface, and the image-side surface S6 of the third lens E3 may be a convex surface. The fourth lens E4 may have a negative refractive power, the object-side surface S7 of the fourth lens E4 may be a concave surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

Table 31 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 31

| f1(mm) | 15.87 | f(mm) | 10.79 |
|---|---|---|---|
| f2(mm) | −8.24 | TTL(mm) | 11.56 |
| f3(mm) | 4.66 | ImgH (mm) | 2.70 |
| f4(mm) | −310.35 | | |
| f5(mm) | −8.11 | | |

Table 32 shows the surface type, the radius of curvature, the thickness, the refractive index, the abbe number and the conic coefficient of each lens of the camera lens group in the present embodiment. The units of the radius of curvature and the thickness are millimeters (mm).

TABLE 32

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.8634 | 1.2978 | 1.55 | 56.1 | −0.2014 |
| S2 | aspheric | 3.5924 | 0.3716 | | | 1.0621 |
| STO | spherical | infinite | −0.0168 | | | |
| S3 | aspheric | 16.2598 | 0.3000 | 1.65 | 23.5 | −55.4226 |
| S4 | aspheric | 3.9731 | 1.0877 | | | −12.1132 |
| S5 | aspheric | 2.8567 | 1.2020 | 1.55 | 56.1 | −5.2880 |
| S6 | aspheric | −19.9370 | 0.6593 | | | 81.8892 |
| S7 | aspheric | −254.1213 | 0.8517 | 1.65 | 23.5 | 99.0000 |
| S8 | aspheric | 941.3450 | 0.7957 | | | −99.0000 |
| S9 | aspheric | −102.5527 | 0.4413 | 1.55 | 56.1 | −99.0000 |
| S10 | aspheric | 4.6332 | 1.2703 | | | −7.8557 |
| S11 | spherical | infinite | 0.3000 | 1.52 | 64.2 | |
| S12 | spherical | infinite | 3.0005 | | | |
| S13 | spherical | infinite | | | | |

Table 33 below shows the high-order coefficients applicable to the aspheric surfaces S1-S10 of the aspheric lenses in the present embodiment. The surface type of each aspheric surface may be defined by the formula (1) given in Embodiment 1.

TABLE 33

| surface number | A4 | A6 | A8 | A10 | A12 | A14 | A16 |
|---|---|---|---|---|---|---|---|
| S1 | −5.1266E−04 | −9.9702E−04 | 5.0464E−04 | −1.6380E−04 | 5.5244E−05 | −1.1951E−05 | 1.3982E−06 |
| S2 | 2.4884E−03 | −1.7094E−02 | 8.8952E−03 | −1.3721E−03 | 4.6308E−05 | −9.7505E−05 | 2.7898E−05 |
| S3 | 1.1630E−02 | −3.9497E−02 | 3.9281E−02 | −1.7906E−02 | 4.0726E−03 | −4.8557E−04 | 2.4420E−05 |
| S4 | 2.2245E−02 | −3.3771E−02 | 3.9078E−02 | −1.9890E−02 | 4.7917E−03 | −5.5921E−04 | 2.4830E−05 |

TABLE 33-continued

| surface number | A4 | A6 | A8 | A10 | A12 | A14 | A16 |
|---|---|---|---|---|---|---|---|
| S5 | 9.2733E−03 | −6.9241E−03 | 3.7540E−03 | −8.8381E−04 | 2.2020E−04 | −4.0636E−05 | 3.5657E−06 |
| S6 | −1.4249E−02 | −1.3160E−03 | 1.7074E−03 | 4.1916E−04 | −3.1890E−04 | 8.3480E−05 | −7.1187E−06 |
| S7 | 1.5933E−02 | 2.8903E−03 | −4.1471E−03 | 3.5085E−03 | −1.5638E−03 | 3.5679E−04 | −3.5593E−05 |
| S8 | 1.3248E−02 | 1.5554E−02 | −1.1717E−02 | 7.0259E−03 | −2.8759E−03 | 6.8508E−04 | −7.6211E−05 |
| S9 | −1.3843E−01 | 7.3076E−02 | −3.4481E−02 | 1.6195E−02 | −5.9679E−03 | 1.4315E−03 | −1.5489E−04 |
| S10 | −1.1621E−01 | 7.2721E−02 | −3.7445E−02 | 1.5994E−02 | −4.8341E−03 | 8.9008E−04 | −7.3059E−05 |

Figure 52:
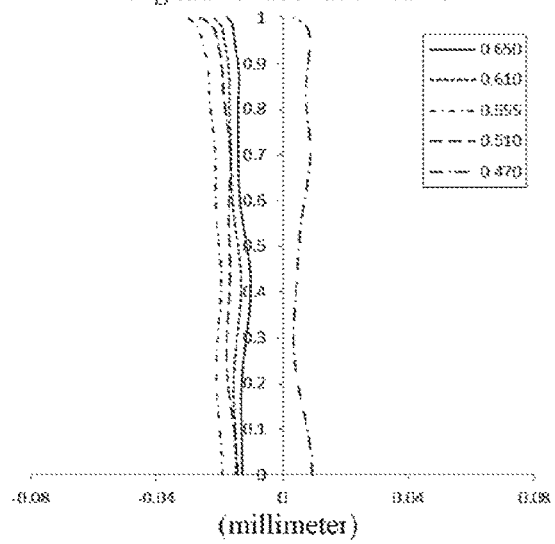
FIGS. 52-55 respectively illustrate a longitudinal aberration curve, an astigmatic curve, a distortion curve and a lateral color curve of the camera lens group according to Embodiment 11.
Figure 53:
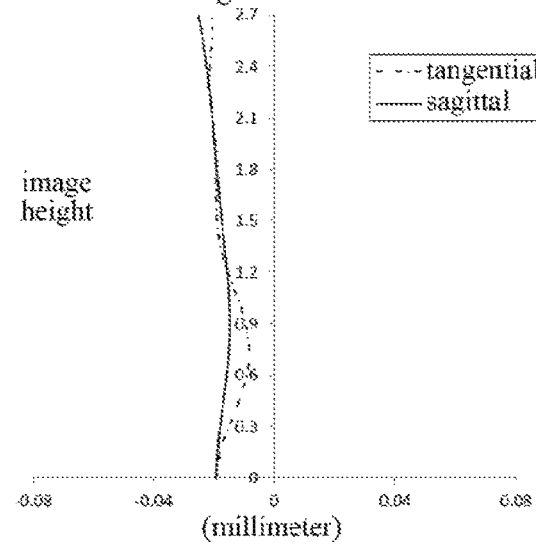
Figure 54:
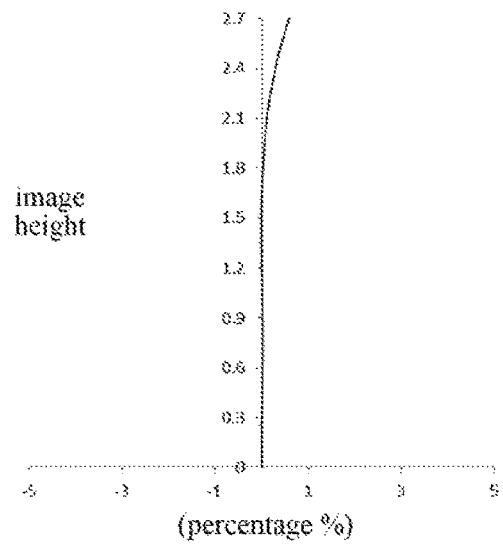
Figure 55:
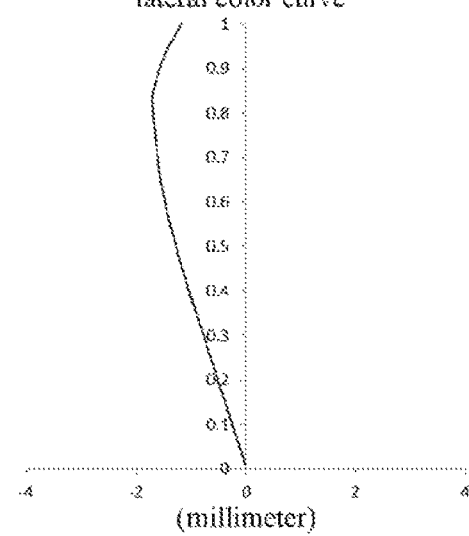

FIG. 52 illustrates the longitudinal aberration curve of the camera lens group according to Embodiment 11, representing deviations of focal points converged by lights of different wavelengths after passing through the optical system. FIG. 53 illustrates the astigmatic curve of the camera lens group according to Embodiment 11, representing a curvature of the tangential image plane and a curvature of the sagittal image plane. FIG. 54 illustrates the distortion curve of the camera lens group according to Embodiment 11, representing amounts of distortion at different viewing angles. FIG. 55 illustrates the lateral color curve of the camera lens group according to Embodiment 11, representing deviations of different image heights on the image plane formed by light passing through the camera lens group. In summary, with reference to FIGS. 51 to 55, the camera lens group according to Embodiment 11 is a camera lens group having a telephoto function, high resolution, and miniaturization.

Embodiment 12

A camera lens group according to Embodiment 12 of the present disclosure is described with reference to FIGS. 56 to 60.

Figure 56:
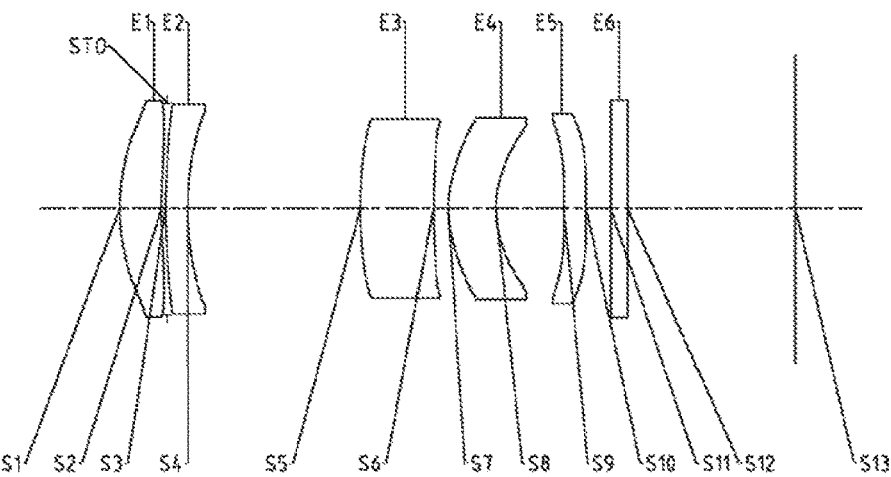
FIG. 56 is a schematic structural diagram illustrating a camera lens group according to Embodiment 12.

FIG. 56 is a schematic structural diagram illustrating the camera lens group according to Embodiment 12. The camera lens group includes, sequentially from an object side to an image side, a first lens E1, a second lens E2, a third lens E3, a fourth lens E4 and a fifth lens E5.

The first lens E1 may have a positive refractive power, the object-side surface S1 of the first lens E1 may be a convex surface, and the image-side surface S2 of the first lens E1 is a concave surface. The second lens E2 may have a negative refractive power, the object-side surface S3 of the second lens E2 may be a convex surface, and the image-side surface S4 of the second lens E2 may be a concave surface. The third lens E3 may have a negative refractive power, the object-side surface S5 of the third lens E3 may be a convex surface, and the image-side surface S6 of the third lens E3 may be a concave surface. The fourth lens E4 may have a positive refractive power, the object-side surface S7 of the fourth lens E4 may be a convex surface, and the image-side surface S8 of the fourth lens E4 may be a concave surface. The fifth lens E5 may have a negative refractive power, the object-side surface S9 of the fifth lens E5 may be a concave surface, and the image-side surface S10 of the fifth lens E5 may be a concave surface.

Table 34 below shows the effective focal lengths f1 to f5 of the first to fifth lenses E1 to E5, the total effective focal length f of the camera lens group, the total track length TTL of the camera lens group, and the half of the diagonal length ImgH (mm) of the effective pixel area on the image plane.

TABLE 34

| f1(mm) | 12.00 | f(mm) | 11.23 |
|---|---|---|---|
| f2(mm) | −40.21 | TTL(mm) | 12.07 |
| f3(mm) | −1000.00 | ImgH (mm) | 2.75 |
| f4(mm) | 39.49 | | |
| f5(mm) | −120.00 | | |

Table 35 shows the surface type, the radius of curvature, the thickness, the refractive index, the abbe number and the conic coefficient of each lens of the camera lens group in the present embodiment. The units of the radius of curvature and the thickness are millimeters (mm).

TABLE 35

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 3.7725 | 0.7345 | 1.55 | 56.1 | −0.1620 |
| S2 | aspheric | 8.2826 | 0.1000 | | | −99.0000 |
| STO | spherical | infinite | −0.0300 | | | |
| S3 | aspheric | 7.3369 | 0.4046 | 1.65 | 23.5 | −99.0000 |
| S4 | aspheric | 5.5945 | 3.0887 | | | −16.1718 |
| S5 | aspheric | 9.6145 | 1.3000 | 1.55 | 56.1 | 0.4224 |
| S6 | aspheric | 8.9970 | 0.2645 | | | 25.2758 |
| S7 | aspheric | 2.0380 | 0.8525 | 1.65 | 23.5 | −8.4185 |
| S8 | aspheric | 1.8521 | 1.2210 | | | −3.9253 |
| S9 | aspheric | −100.0000 | 0.3967 | 1.55 | 56.1 | −99.0000 |
| S10 | aspheric | 190.2174 | 0.4382 | | | 99.0000 |
| S11 | spherical | infinite | 0.3000 | 1.52 | 64.2 | |
| S12 | spherical | infinite | 3.0005 | | | |
| S13 | spherical | infinite | | | | |

Table 36 below shows the high-order coefficients applicable to the aspheric surfaces S1-S10 of the aspheric lenses in the present embodiment. The surface type of each aspheric surface may be defined by the formula (1) given in Embodiment 1.

TABLE 36

| surface number | A4 | A6 | A8 | A10 | A12 | A14 | A16 |
|---|---|---|---|---|---|---|---|
| S1 | −2.2435E−03 | −8.2772E−04 | 2.3914E−03 | −1.8243E−03 | 6.7428E−04 | −1.2971E−04 | 9.2705E−06 |
| S2 | −2.8412E−02 | 4.0459E−02 | −3.6457E−02 | 1.8452E−02 | −5.2760E−03 | 7.8748E−04 | −4.8018E−05 |
| S3 | −1.3471E−02 | 3.4292E−02 | −3.9025E−02 | 2.2228E−02 | −6.8109E−03 | 1.0858E−03 | −7.0523E−05 |
| S4 | 8.5899E−03 | 1.0415E−02 | −1.7741E−02 | 1.2300E−02 | −4.3883E−03 | 8.1816E−04 | −6.2895E−05 |
| S5 | 8.5213E−03 | −1.4930E−03 | 1.2518E−03 | −6.3383E−04 | 3.1411E−04 | −7.1516E−05 | 5.9188E−06 |
| S6 | −5.8602E−02 | 5.7574E−02 | −4.3652E−02 | 2.4371E−02 | −8.9073E−03 | 1.9341E−03 | −1.8485E−04 |
| S7 | 3.6412E−02 | −2.9585E−02 | 2.6140E−02 | −1.5532E−02 | 5.6268E−03 | −1.1244E−03 | 9.6144E−05 |
| S8 | 1.8062E−02 | 3.9180E−03 | 1.1075E−03 | −1.7591E−03 | 5.8350E−04 | −1.9504E−04 | 3.8028E−05 |
| S9 | −5.3906E−02 | 4.2182E−03 | 1.3450E−02 | −9.0997E−03 | 2.6546E−03 | −2.9695E−04 | −1.8666E−05 |
| S10 | −5.0075E−02 | 6.5522E−03 | 5.4406E−03 | −4.6421E−03 | 1.6108E−03 | −2.8553E−04 | 1.6107E−05 |

Figure 57:
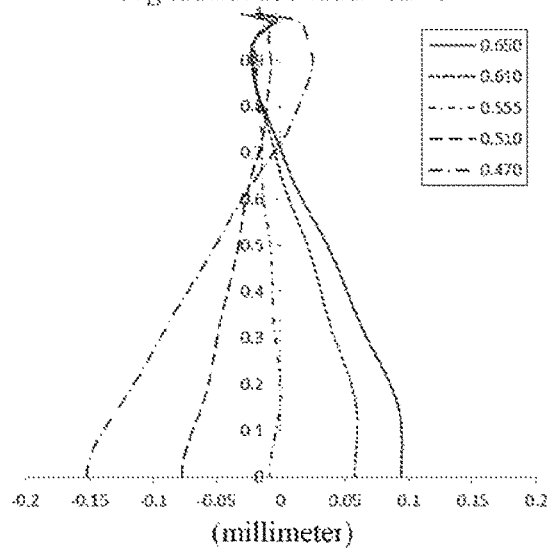
FIGS. 57-60 respectively illustrate a longitudinal aberration curve, an astigmatic curve, a distortion curve and a lateral color curve of the camera lens group according to Embodiment 12.
Figure 58:
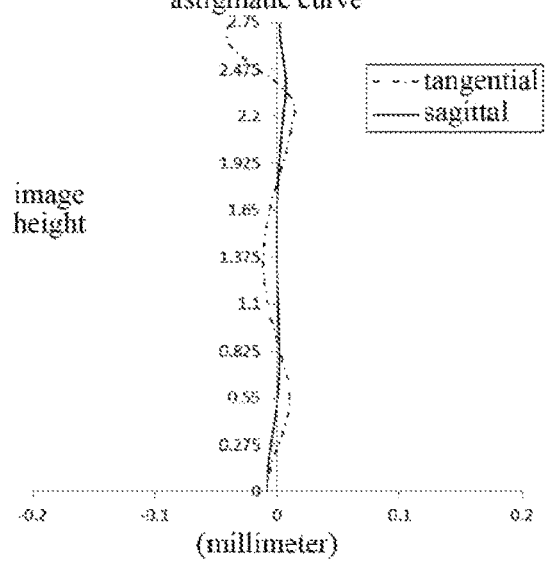
Figure 59:
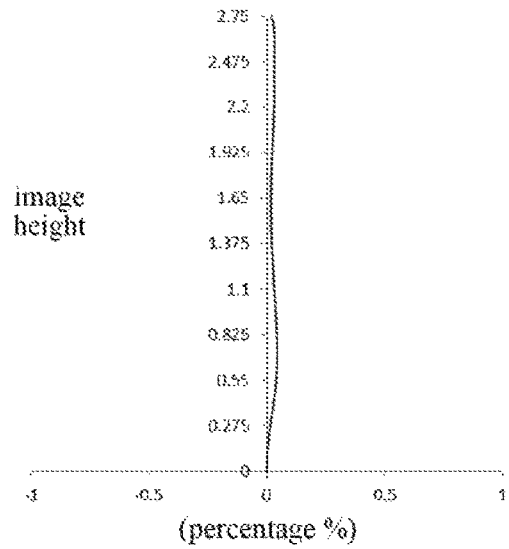
Figure 60:
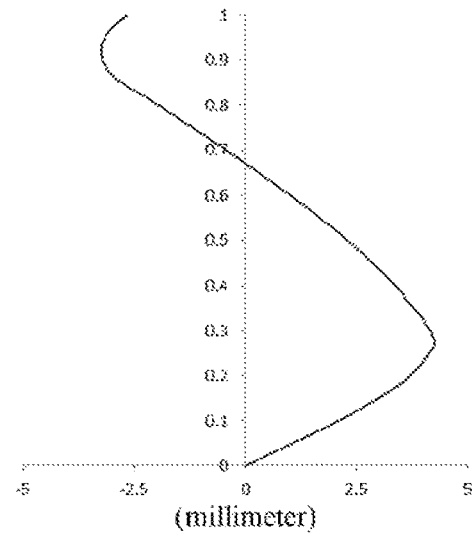

FIG. 57 illustrates the longitudinal aberration curve of the camera lens group according to Embodiment 12, representing deviations of focal points converged by lights of different wavelengths after passing through the optical system. FIG. 58 illustrates the astigmatic curve of the camera lens group according to Embodiment 12, representing a curvature of the tangential image plane and a curvature of the sagittal image plane. FIG. 59 illustrates the distortion curve of the camera lens group according to Embodiment 12, representing amounts of distortion at different viewing angles. FIG. 60 shows the lateral color curve of the camera lens group according to Embodiment 12, representing deviations of different image heights on the image plane after light passing through the camera lens group. In summary, with reference to FIGS. 56 to 60, the camera lens group according to Embodiment 12 is a camera lens group having a telephoto function, high resolution, and miniaturization.

To sum up, in Embodiments 1-12 described above, the conditional expressions satisfy the relationships shown in Table 37 below.

TABLE 37

| Conditional Expression/Embodiment | 1 | 2 | 3 | 4 | 5 | 6 |
|---|---|---|---|---|---|---|
| f/ImgH | 3.63 | 3.56 | 3.63 | 3.63 | 3.63 | 3.63 |
| f1/EPD | 4.19 | 3.83 | 3.36 | 3.35 | 3.96 | 4.09 |
| (R1 − R2)/(R1 + R2) | −0.19 | −0.17 | −0.24 | −0.26 | −0.19 | −0.18 |
| CT5/DT52 | 0.21 | 0.26 | 0.27 | 0.26 | 0.23 | 0.21 |
| \|f/f1\| + \|f/f2\| + \|f/f5\| | 3.07 | 2.39 | 3.28 | 3.26 | 3.14 | 3.08 |
| (SAG31 + SAG41)/(T23 + T34) | 0.99 | 0.69 | 1.27 | 1.25 | 1.10 | 1.01 |
| f*TAN(HFOV)/CT3 | 2.04 | 2.10 | 2.24 | 2.10 | 2.04 | 2.04 |
| (R4 + R5)/(R9 + R10) | −0.03 | −0.09 | 0.02 | −0.01 | 0.13 | 0.20 |
| (f23 + f45)/(f23 − f45) | −0.15 | −0.16 | 0.32 | 0.43 | −0.16 | −0.17 |
| ΣCT/TTL | 0.44 | 0.38 | 0.39 | 0.43 | 0.43 | 0.42 |
| T12/T45 | 0.45 | 0.29 | 0.48 | 0.46 | 0.45 | 0.46 |

| Conditional Expression/Embodiment | 7 | 8 | 9 | 10 | 11 | 12 |
|---|---|---|---|---|---|---|
| f/ImgH | 3.56 | 3.56 | 3.93 | 3.92 | 4.00 | 4.08 |
| f1/EPD | 3.80 | 3.73 | 4.13 | 4.14 | 4.32 | 3.10 |
| (R1 − R2)/(R1 + R2) | −0.17 | −0.18 | −0.13 | −0.13 | −0.11 | −0.37 |
| CT5/DT52 | 0.24 | 0.26 | 0.26 | 0.27 | 0.27 | 0.23 |
| \|f/f1\| + \|f/f2\| + \|f/f5\| | 2.47 | 3.07 | 3.65 | 3.63 | 3.32 | 1.31 |
| (SAG31 + SAG41)/(T23 + T34) | 0.74 | 1.04 | 0.46 | 0.44 | 0.42 | 0.21 |
| f*TAN(HFOV)/CT3 | 2.09 | 2.09 | 2.08 | 2.09 | 2.23 | 2.11 |
| (R4 + R5)/(R9 + R10) | 0.27 | −0.07 | −0.05 | −0.04 | −0.07 | 0.17 |
| (f23 + f45)/(f23 − f45) | −0.17 | −0.17 | 0.04 | 0.04 | 0.02 | −0.19 |
| ΣCT/TTL | 0.38 | 0.39 | 0.35 | 0.37 | 0.35 | 0.31 |
| T12/T45 | 0.32 | 0.36 | 0.46 | 0.43 | 0.45 | 0.06 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A camera lens group, from an object side to an image side sequentially comprising: a first lens, a second lens, a third lens, a fourth lens and a fifth lens, wherein,
the first lens has a positive refractive power, and an object-side surface of the first lens is a convex surface;
the second lens has a negative refractive power, and an image-side surface of the second lens is a concave surface;
the third lens has a refractive power, and an object-side surface of the third lens is a convex surface;
the fourth lens has a refractive power;
the fifth lens has a negative refractive power, and an image-side surface of the fifth lens is a concave surface;
an effective focal length f of the camera lens group and half of a diagonal length ImgH of an effective pixel area on an image plane of the camera lens group satisfy: $3.5 < f/\text{ImgH} < 4.5$; and
an effective focal length f1 of the first lens and an entrance pupil diameter EPD of the camera lens group satisfy: $3 < f1/\text{EPD} < 4.5$.

2. The camera lens group according to claim 1, wherein a center thickness CT5 of the fifth lens on an optical axis and a maximum effective radius DT52 of the image-side surface of the fifth lens satisfy: $\text{CT5}/\text{DT52} < 0.3$.

3. The camera lens group according to claim 1, wherein the effective focal length f of the camera lens group, the effective focal length f1 of the first lens, an effective focal length f2 of the second lens, and an effective focal length f5 of the fifth lens satisfy: $1 < |f/f1| + |f/f2| + |f/f5| < 4$.

4. The camera lens group according to claim 1, wherein the effective focal length f of the camera lens group, half of a maximal field-of-view HFOV of the camera lens group, and a center thickness CT3 of the third lens on the optical axis satisfy: $2 \leq f*\tan(\text{HFOV})/\text{CT3} < 2.5$.

5. The camera lens group according to claim 1, wherein a radius of curvature R4 of the image-side surface of the second lens, a radius of curvature R5 of the object-side surface of the third lens, a radius of curvature R9 of an object-side surface of the fifth lens, and a radius of curvature R10 of the image-side surface of the fifth lens satisfy: $-0.1 < (R4+R5)/(R9+R10) < 0.4$.

6. The camera lens group according to claim 1, wherein a combined focal length f23 of the second lens and the third lens, and a combined focal length f45 of the fourth lens and the fifth lens satisfy: $-0.3 < (f23+f45)/(f23-f45) < 0.5$.

7. The camera lens group according to claim 1, wherein a sum of central thicknesses ΣCT of the first lens to the fifth lens on the optical axis and a distance on the optical axis TTL from the object-side surface of the first lens to the image plane satisfy: $0.2 < \Sigma\text{CT}/\text{TTL} < 0.5$.

8. The camera lens group according to claim 1, wherein an air spacing T12 on the optical axis between the first lens and the second lens and an air spacing T45 on the optical axis between the fourth lens and the fifth lens satisfy: $\text{T12}/\text{T45} < 0.5$.

9. The camera lens group according to claim 1, wherein a radius of curvature R1 of the object-side surface of the first lens and a radius of curvature R2 of an image-side surface of the first lens satisfy: $-0.5 < (R1-R2)/(R1+R2) < 0$.

10. The camera lens group according to claim 1, wherein, $0.2 < (\text{SAG31}+\text{SAG41})/(\text{T23}+\text{T34}) < 1.5$, wherein, SAG31 is an axial distance from an intersection of the object-side surface of the third lens and the optical axis to a vertex of an effective radius of the object-side surface of the third lens, SAG41 is an axial distance from an intersection of an object-side surface of the fourth lens and the optical axis to a vertex of an effective radius of the object-side surface of the fourth lens, T23 is an air spacing on the optical axis between the second lens and the third lens and T34 is an air spacing on the optical axis between the third lens and the fourth lens.

11. A camera lens group, from an object side to an image side sequentially comprising: a first lens, a second lens, a third lens, a fourth lens and a fifth lens, wherein,
the first lens has a positive refractive power, and an object-side surface of the first lens is a convex surface;
the second lens has a negative refractive power, and an image-side surface of the second lens is a concave surface;
the third lens has a refractive power, and an object-side surface of the third lens is a convex surface;
the fourth lens has a refractive power;
the fifth lens has a negative refractive power, and an image-side surface of the fifth lens is a concave surface; and
$0.2 < (\text{SAG31}+\text{SAG41})/(\text{T23}+\text{T34}) < 1.5$, wherein, SAG31 is a distance on an optical axis from an intersection of the object-side surface of the third lens and the optical axis to a vertex of an effective radius of the object-side surface of the third lens, SAG41 is a distance on the optical axis from an intersection of an object-side surface of the fourth lens and the optical axis to a vertex of an effective radius of the object-side surface of the fourth lens, T23 is an air spacing on the optical axis between the second lens and the third lens, and T34 is an air spacing on the optical axis between the third lens and the fourth lens.

12. The camera lens group according to claim 11, wherein a center thickness CT5 of the fifth lens on an optical axis and a maximum effective radius DT52 of the image-side surface of the fifth lens satisfy: $\text{CT5}/\text{DT52} < 0.3$.

13. The camera lens group according to claim 11, wherein the effective focal length f of the camera lens group, the effective focal length f1 of the first lens, an effective focal length f2 of the second lens, and an effective focal length f5 of the fifth lens satisfy: $1 < |f/f1| + |f/f2| + |f/f5| < 4$.

14. The camera lens group according to claim 11, wherein the effective focal length f of the camera lens group, half of a maximal field-of-view HFOV of the camera lens group, and a center thickness CT3 of the third lens on the optical axis satisfy: $2 \leq f*\tan(\text{HFOV})/\text{CT3} < 2.5$.

15. The camera lens group according to claim 11, wherein a radius of curvature R4 of the image-side surface of the second lens, a radius of curvature R5 of the object-side surface of the third lens, a radius of curvature R9 of an object-side surface of the fifth lens, and a radius of curvature R10 of the image-side surface of the fifth lens satisfy: $-0.1 < (R4+R5)/(R9+R10) < 0.4$.

16. The camera lens group according to claim 11, wherein a combined focal length f23 of the second lens and the third lens, and a combined focal length f45 of the fourth lens and the fifth lens satisfy: $-0.3 < (f23+f45)/(f23-f45) < 0.5$.

17. The camera lens group according to claim 11, wherein a sum of central thicknesses $\Sigma CT$ of the first lens to the fifth lens on the optical axis and a distance on the optical axis TTL from the object-side surface of the first lens to the image plane satisfy: $0.2 < \Sigma CT/TTL < 0.5$.

18. The camera lens group according to claim 11, wherein an air spacing T12 on the optical axis between the first lens and the second lens and an air spacing T45 on the optical axis between the fourth lens and the fifth lens satisfy: $T12/T45 < 0.5$.

19. The camera lens group according to claim 11, wherein a radius of curvature R1 of the object-side surface of the first lens and a radius of curvature R2 of an image-side surface of the first lens satisfy: $-0.5 < (R1-R2)/(R1+R2) < 0$.

20. The camera lens group according to claim 11, wherein, $0.21 < (SAG31+SAG41)/(T23+T34) < 1.27$.

* * * * *